US012786775B2

(12) United States Patent
Takano

(10) Patent No.: US 12,786,775 B2
(45) Date of Patent: Nov. 3, 2026

(54) COMMUNICATION DEVICE, COMMUNICATION CONTROL DEVICE, COMMUNICATION METHOD, AND COMMUNICATION CONTROL METHOD

(71) Applicant: SONY GROUP CORPORATION, Tokyo (JP)

(72) Inventor: Hiroaki Takano, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 237 days.

(21) Appl. No.: 18/814,134

(22) Filed: Aug. 23, 2024

(65) Prior Publication Data

US 2024/0422830 A1 Dec. 19, 2024

Related U.S. Application Data

(63) Continuation of application No. 17/309,869, filed as application No. PCT/JP2019/048483 on Dec. 11, 2019, now Pat. No. 12,133,262.

(30) Foreign Application Priority Data

Jan. 9, 2019 (JP) ................................ 2019-002219

(51) Int. Cl.
*H04W 24/10* (2009.01)
*H04B 7/06* (2006.01)
(Continued)

(52) U.S. Cl.
CPC ........ *H04W 24/10* (2013.01); *H04B 7/06956* (2023.05); *H04W 56/001* (2013.01); *H04W 74/0833* (2013.01); *H04W 74/0838* (2024.01)

(58) Field of Classification Search
CPC ............ H04W 74/0833; H04W 24/10; H04W 56/001; H04W 16/28; H04W 74/004;
(Continued)

(56) References Cited

U.S. PATENT DOCUMENTS 11,206,549 B1 * 12/2021 Eyuboglu ............ H04J 11/0073
2017/0230854 A1 8/2017 Harada et al.
(Continued)

FOREIGN PATENT DOCUMENTS

AU 2014201715 A1 4/2014
CN 106576337 A 4/2017
(Continued)

OTHER PUBLICATIONS

International Search Report and Written Opinion of PCT Application No. PCT/JP2019/048483, issued on Mar. 17, 2020, 08 pages of English Translation and 07 pages of ISRWO.
(Continued)

*Primary Examiner* — Abdullahi Ahmed
(74) *Attorney, Agent, or Firm* — CHIP LAW GROUP

(57) ABSTRACT

Provided is a communication device including: an acquisition unit that acquires setting for transmitting measurement results of beams by setting synchronization signal blocks transmitted from base stations having the same cell identifier as one synchronization signal group and specifying a synchronization signal block in the synchronization signal group and the base station to which the synchronization signal block belongs; and a communication control unit that transmits the measurement results of the beams on the basis of the setting.

20 Claims, 19 Drawing Sheets

(51) Int. Cl.
*H04W 56/00* (2009.01)
*H04W 74/0833* (2024.01)
*H04W 74/0838* (2024.01)

(58) Field of Classification Search
CPC ... H04B 7/0632; H04B 7/0695; H04L 5/0007; H04L 5/001; H04L 5/0023; H04L 5/0053; H04L 5/0048
See application file for complete search history.

(56) References Cited

U.S. PATENT DOCUMENTS

| | | | |
|---|---|---|---|
| 2018/0198575 | A1 | 7/2018 | Sheng et al. |
| 2019/0150190 | A1 | 5/2019 | Kim et al. |
| 2019/0182785 | A1 | 6/2019 | Da Silva et al. |
| 2020/0128417 | A1* | 4/2020 | Yoon ..................... H04W 24/08 |
| 2020/0275319 | A1* | 8/2020 | Murray ................ H04B 7/0617 |
| 2020/0305038 | A1* | 9/2020 | Tooher .................. H04W 24/10 |
| 2020/0359321 | A1* | 11/2020 | Chen ..................... H04L 5/0007 |
| 2021/0306127 | A1 | 9/2021 | Sundberg et al. |
| 2021/0385847 | A1* | 12/2021 | Kang ................. H04B 7/06968 |
| 2022/0061031 | A1* | 2/2022 | Park .................. H04W 74/0808 |
| 2022/0070689 | A1 | 3/2022 | Takano |

FOREIGN PATENT DOCUMENTS

| | | | |
|---|---|---|---|
| CN | 107211289 | A | 9/2017 |
| CN | 109155948 | A | 1/2019 |
| CN | 109845334 | A | 6/2019 |
| EP | 3197225 | A1 | 7/2017 |
| EP | 3437371 | A1 | 2/2019 |
| EP | 3471497 | A1 | 4/2019 |
| JP | 2014-524217 | A | 9/2014 |
| JP | 2016-039524 | A | 3/2016 |
| JP | 2019-522942 | A | 8/2019 |
| JP | 2019-526968 | A | 9/2019 |
| KR | 10-2019-0002443 | A | 1/2019 |
| KR | 10-2021-0125115 | A | 10/2021 |
| TW | 201842745 | A | 12/2018 |
| WO | 2016/021634 | A1 | 2/2016 |
| WO | 2017/173037 | A1 | 10/2017 |
| WO | 2018/008212 | A1 | 1/2018 |
| WO | 2018/029362 | A1 | 2/2018 |
| WO | 2018/128977 | A1 | 7/2018 |
| WO | 2018/203673 | A1 | 11/2018 |

OTHER PUBLICATIONS

Measurement based on SS set, Intel Corporation, 3GPP TSG RAN WG2, 97th Meeting, Athens, Greece, R2-1701714, Feb. 13-17, 2017, 07 pages.
Extended European Search Report of EP Application No. 19909442.6, issued on Feb. 18, 2022, 09 pages.
Notice of Allowance for U.S. Appl. No. 17/309,869, issued on May 16, 2024, 07 pages.
Non Final Action for U.S. Appl. No. 17/309,869, issued on Dec. 5, 2023, 14 pages.
International Preliminary Report on Patentability of PCT Application No. PCT/JP2019/048483, issued on Jul. 22, 2021, 08 pages of English Translation and 04 pages of IPRP.
Xincheng Zhang et al: "Interference Suppression and eICIC Technology" In: "LTE-Advanced Air Interface Technology", Sep. 5, 2012 (Sep. 5, 2012), 42 pgs., CRC Press, XP055104344.

* cited by examiner

COMMUNICATION DEVICE, COMMUNICATION CONTROL DEVICE, COMMUNICATION METHOD, AND COMMUNICATION CONTROL METHOD

CROSS REFERENCE TO RELATED APPLICATIONS

This application is a continuation application of U.S. patent application Ser. No. 17/309,869 filed on Jun. 24, 2021, which is a U.S. National Phase of International Patent Application No. PCT/JP2019/048483 filed on Dec. 11, 2019, which claims priority benefit of Japanese Patent Application No. JP 2019-002219 filed in the Japan Patent Office on Jan. 9, 2019. Each of the above-referenced applications is hereby incorporated herein by reference in its entirety.

FIELD

The present disclosure relates to a communication device, a communication control device, a communication method, a communication control method, and a computer program.

BACKGROUND

A wireless access system and a wireless network (hereinafter, also called "Long Term Evolution (LTE)", "LTE-Advanced (LTE-A)", "LTE-Advanced Pro (LTE-A Pro)", "5G (5th generation)" "New Radio (NR)", "New Radio Access Technology (NRAT)", "Evolved Universal Terrestrial Radio Access (EUTRA)", or "Further EUTRA (FEUTRA)") for cellular mobile communication have been examined in the 3rd Generation Partnership Project (3GPP). Note that, in the following description, LTE includes LTE-A, LTE-A Pro, and EUTRA, and NR includes NRAT and FEUTRA. In LTE and NR, a base station device (base station) is also called evolved NodeB (eNodeB) in LTE and gNodeB in NR, and a terminal device (a mobile station, a mobile station device, and a terminal) is also called User Equipment (UE). LTE and NR are cellular communication systems in which a plurality of areas covered by base stations are arranged in a cell shape. A single base station may manage a plurality of cells.

For example, Patent Literature 1 discloses a frame for performing communication using beamforming in a wireless communication system using a plurality of beamforming antennas.

CITATION LIST

Patent Literature

Patent Literature 1: JP 2014-524217 A

SUMMARY

Technical Problem

However, conventional beamformed synchronization signals and Physical Broadcast Channel (PBCH: system information) have a configuration in which it is not assumed that the synchronization signals and PBCH are transmitted from a plurality of base stations (see 3GPP TS38.211, TS38.213). Therefore, if the conventional beamformed synchronization signals and PBCH are applied to an environment in which the synchronization signals and PBCH are transmitted from the plurality of base stations using beamforming, a signal reception load of the terminal may increase.

Therefore, the present disclosure proposes a new and improved communication device, communication control device, communication method, communication control method, and computer program capable of suppressing a reception load of a terminal from increasing, when beamformed signals are transmitted from a plurality of base stations.

Solution to Problem

According to the present disclosure, there is provided a communication device including: an acquisition unit that acquires setting for transmitting measurement results of beams by setting synchronization signal blocks transmitted from base stations having the same cell identifier as one synchronization signal group and specifying a synchronization signal block in the synchronization signal group and the base station to which the synchronization signal block belongs; and a communication control unit that transmits the measurement results of the beams on the basis of the setting.

Further, according to the present disclosure, there is provided a communication control device including: a communication control unit that generates setting for causing a terminal device to transmit measurement results of beams by setting synchronization signal blocks transmitted from base stations having the same cell identifier as one synchronization signal group and specifying which synchronization signal block in the synchronization signal group belongs to which base station; and an acquisition unit that acquires the measurement results of the beams based on the setting from the terminal device.

Further, according to the present disclosure, there is provided a communication method including: acquiring setting for transmitting measurement results of beams by setting synchronization signal blocks transmitted from base stations having the same cell identifier as one synchronization signal group and specifying which synchronization signal block in the synchronization signal group belongs to which base station; and transmitting the measurement results of the beams on the basis of the setting.

Further, according to the present disclosure, there is provided a communication control method including: generating setting for causing a terminal device to transmit measurement results of beams by setting synchronization signal blocks transmitted from base stations having the same cell identifier as one synchronization signal group and specifying which synchronization signal block in the synchronization signal group belongs to which base station; and acquiring the measurement results of the beams based on the setting from the terminal device.

Further, according to the present disclosure, there is provided a computer program for causing a computer to execute: acquiring setting for transmitting measurement results of beams by setting synchronization signal blocks transmitted from base stations having the same cell identifier as one synchronization signal group and specifying which synchronization signal block in the synchronization signal group belongs to which base station; and transmitting the measurement results of the beams on the basis of the setting.

Further, according to the present disclosure, there is provided a computer program for causing a computer to execute: generating setting for causing a terminal device to transmit measurement results of beams by setting synchronization signal blocks transmitted from base stations having the same cell identifier as one synchronization signal group and specifying which synchronization signal block in the synchronization signal group belongs to which base station; and acquiring the measurement results of the beams based on the setting from the terminal device.

DESCRIPTION OF EMBODIMENTS

Figure 1:
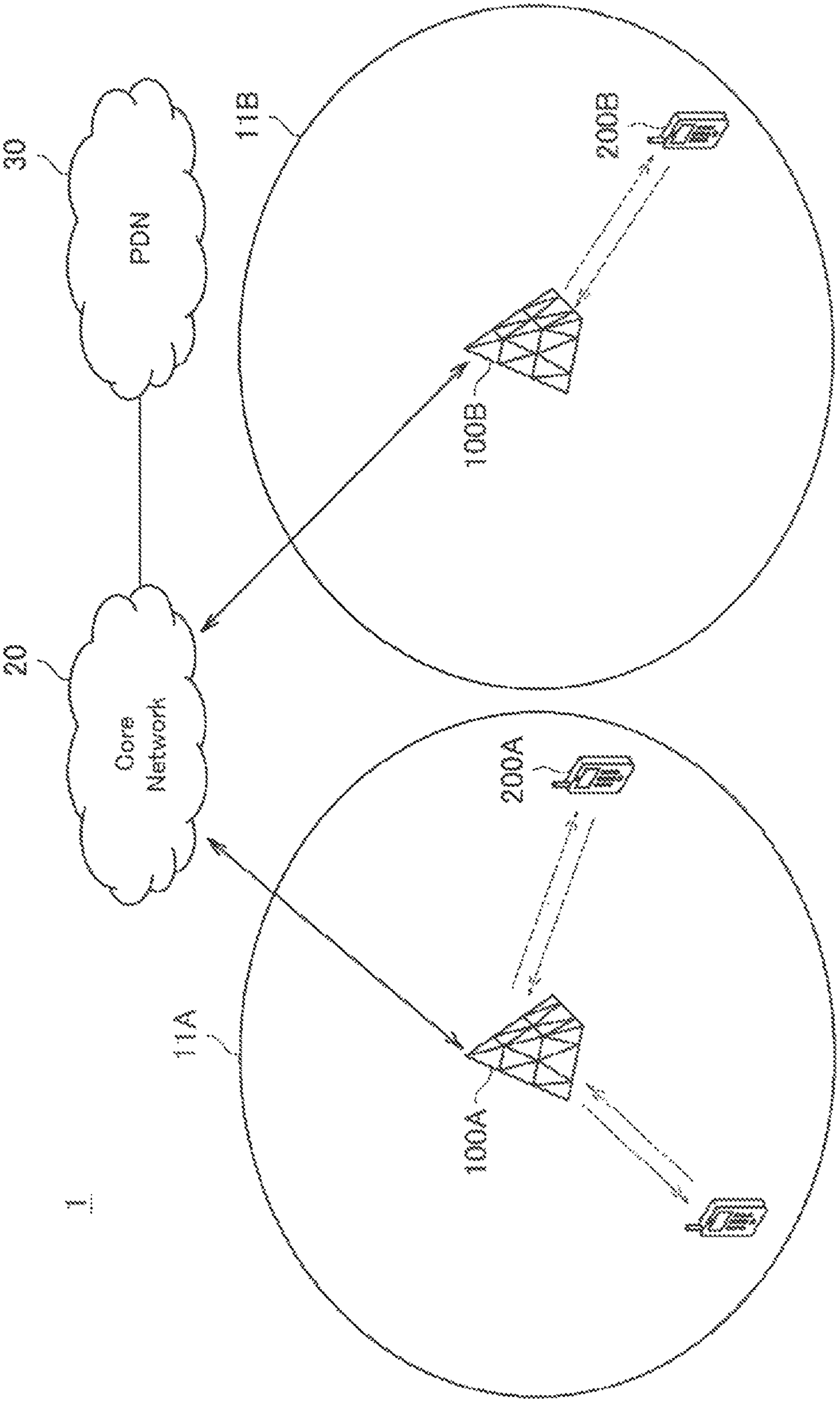
FIG. 1 is a diagram illustrating an example of an overall configuration of a system according to an embodiment of the present disclosure.

Hereinafter, preferred embodiments of the present disclosure will be described in detail with reference to the accompanying drawings. Note that, in the present specification and the drawings, redundant description of components having substantially the same functional configuration is omitted by assigning the same reference numerals.

Note that the description will be given in the following order.

1. Introduction
1.1. System configuration
1.2. Related technology
1.3. Outline of proposed technology
2. Configuration example
2.1. Configuration example of base station
2.2. Configuration example of terminal device
3. First embodiment
4. Second embodiment
5. Application example
6. Conclusion

1. INTRODUCTION

1.1. System Configuration

FIG. 1 is a diagram illustrating an example of an overall configuration of a system 1 according to an embodiment of the present disclosure. As illustrated in FIG. 1, the system 1 includes base stations 100 (100A and 100B), terminal devices 200 (200A and 200B), a core network 20, and a packet data network (PDN) 30.

The base station 100 is a communication device that operates cells 11 (11A and 11B) and provides wireless services to one or more terminal devices located inside the cells 11. For example, the base station 100A provides a wireless service to the terminal device 200A, and the base station 100B provides a wireless service to the terminal device 200B. The cell 11 can be operated according to any wireless communication system such as LTE or New Radio (NR). The base station 100 is connected to the core network 20. The core network 20 is connected to the PDN 30.

The core network 20 can include, for example, a mobility management entity (MME), a serving gateway (S-GW), a PDN gateway (P-GW), a policy and charging rule function (PCRF), and a home subscriber server (HSS). The MME is a control node that handles signals of a control plane, and manages a movement state of the terminal device. The S-GW is a control node that handles signals of a user plane, and is a gateway device that switches a transfer path of user data. The P-GW is a control node that handles signals of the user plane, and is a gateway device that functions as a connection point between the core network 20 and the PDN 30. The PCRF is a control node that controls policies such as Quality of Service (QOS) for bearers and billing. The HSS is a control node that handles subscriber data and controls services.

The terminal device 200 is a communication device that wirelessly communicates with the base station 100 on the basis of the control of the base station 100. The terminal device 200 may be a so-called user terminal (User Equipment: UE). For example, the terminal device 200 transmits an uplink signal to the base station 100 and receives a downlink signal from the base station 100.

1.2. Related Technology (1) Bandwidth Part (BWP)

Figure 2:
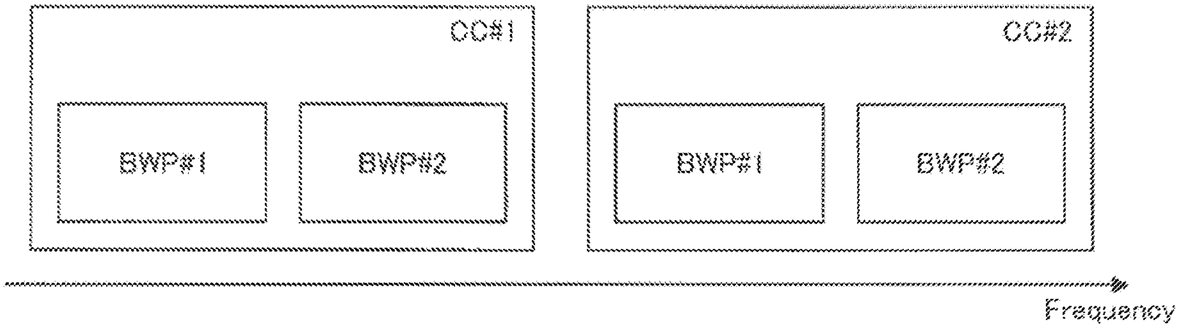
FIG. 2 is a diagram for explaining a BWP.

FIG. 2 is a diagram for explaining a BWP. As illustrated in FIG. 2, CC #1 includes a plurality of BWPs (#1 and #2), and CC #2 includes a plurality of BWPs (#1 and #2). Note that, in the present specification, the number after #indicates an index. BWPs included in different CCs indicate different BWPs even if indexes are the same. The BWP divides a CC, which is one operation frequency bandwidth (operation bandwidth), into a plurality of frequency bandwidths. In each BWP, different subcarrier spacing can be set.

The BWP has been standardized as the basic frame format for NR in 3GPP Rel15. In an OFDM modulation system standardized by Rel8 for LTE, subcarrier spacing is fixed at 15 kHz. On the other hand, in Rel15, the subcarrier spacing can be set to 60 KHz, 120 KHz, or 240 kHz. When the subcarrier spacing increases, the OFDM symbol length decreases. For example, in LTE, since the subcarrier spacing is 15 kHz, it is possible to transmit one slot per ms, in other words, it is possible to transmit 14 OFDM symbols. On the other hand, in NR, it is possible to transmit 2 slots when the subcarrier spacing is 60 kHz, 4 slots when the subcarrier spacing is 120 kHz, and 8 slots when the subcarrier spacing is 240 KHz. As described above, the subcarrier increases, so that the OFDM symbol length decreases. Therefore, it is possible to provide a frame configuration suitable for low-delay communication.

In NR, it is possible to simultaneously provide BWPs with different subcarrier spacing set. Therefore, in NR, it is possible to simultaneously provide a plurality of BWPs corresponding to different use cases.

(2) Number of Active BWPs

A BWP that can perform transmission and reception is also called an active BWP. The number of BWPs that can perform transmission and reception at the same time is also called the number of active BWPs. The number of active BWPs in the base station 100 is plural. On the other hand, the number of active BWPs in the terminal device 200 may be one. Of course, the terminal device 200 with a plurality of active BWPs is also expected to appear in the future. These scenarios are illustrated in the following Table 1.

TABLE 1

Scenario for number of active BWPs

| Scenario | Active BWP |
|---|---|
| 3GPP Rel15 | Terminal device can use only one BWP at same time |
| Expected future scenario | Terminal device can use plurality of BWPs at same time |

In the technology according to the present disclosure, it is assumed that the number of active BWPs in the terminal device 200 is one.

(3) Relation Between CC and BWP

In the present embodiment, the description focuses on a plurality of BWPs. However, an antenna switching method of the present disclosure described later is also applicable to a case of a plurality of component carriers (CCs). The CC is an operating frequency band. In reality, it is conceivable that adjacent BWPs are often applied. This is because the adjacent BWPs are closer in frequency. Therefore, the part described as the BWP in the present disclosure may be basically replaced with the CC. Although It is assumed that a plurality of BWPs can be used at the same time, in a case of the CC, it is assumed that a plurality of CCs can be used at the same time.

(4) Codebook Based Beamforming

The base station 100 can improve a communication quality, for example, by performing beamforming and communicating with the terminal device 200. As a beamforming method, there are a method for generating a beam following the terminal device 200 and a method for selecting a beam following the terminal device 200 from candidate beams. The former method is unlikely to be adopted in a future wireless communication system (for example, 5G) because a calculation cost is required each time a beam is generated. On the other hand, the latter method is also adopted in Full Dimension Multiple Input Multiple Output (FD-MIMO) of Release 13 of Third Generation Partnership Project (3GPP). The latter method is also called codebook based beamforming.

In the codebook based forming, the base station 100 prepares (that is, generates) a beam in all directions in advance, and among the prepared beams, selects a beam suitable for the target terminal device 200 from the beams prepared in advance, and communicates with the terminal device 200 using the selected beam. For example, when it is possible to perform 360-degree communication in a horizontal direction, the base station 100 prepares 360 types of beams, for example, in 1-degree increments. When the beams are formed to be half overlapped with each other, the base station 100 prepares 720 types of beams. In a vertical direction, the base station 100 prepares beams for 180 degrees, for example, from −90 degrees to +90 degrees.

Since the terminal device 200 only observes the beam, there is little need to know the existence of the codebook on the side of the base station 100.

A plurality of beams prepared in advance by the base station 100 are also called beam groups below. The beam group can be defined for each frequency band, for example. Further, the beam group can be defined for each Rx/Tx beam and for each downlink/uplink.

(5) Beam Sweeping

Figure 3:
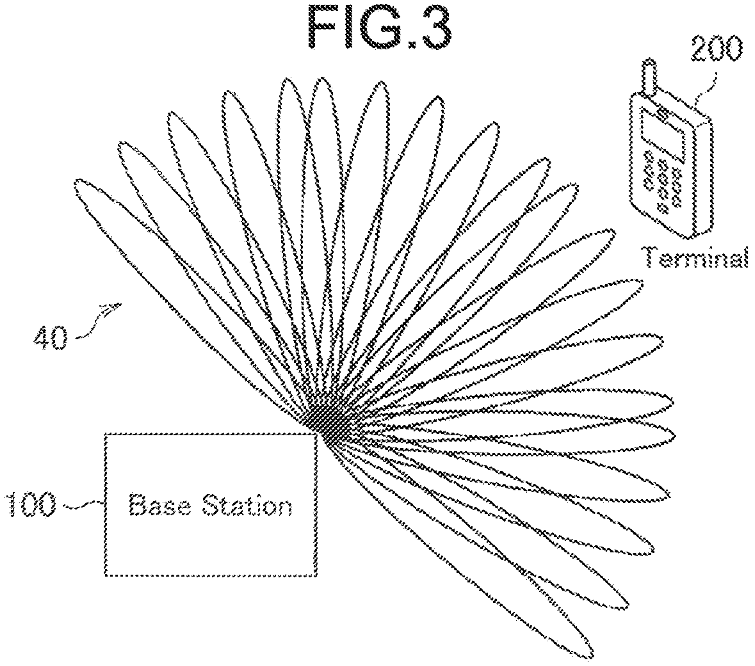
FIG. 3 is a diagram for explaining beam sweeping.

In NR, in order to select an optimum beam to be used for communication, beam sweeping which transmits or receives a measurement signal (known signal) using each of a plurality of beams belonging to the beam group is examined. The measurement signal may also be called a reference signal. An optimum transmission (hereinafter, also called the Tx beam) can be selected on the basis of a measurement result of the measurement signal transmitted while beam sweeping. An example thereof will be described with reference to FIG. 3, FIG. 3 is a diagram for explaining the beam sweeping. In the example illustrated in FIG. 3, the base station 100 transmits the measurement signal while beam sweeping (that is, switching the Tx beam) using the beam group 40. In addition, transmitting while beam sweeping is also called beam sweeping transmission below. Then, the terminal device 200 measures the measurement signal transmitted while beam sweeping and determines a Tx beam which is most easily received. In this way, the optimum Tx beam of the base station 100 is selected. By exchanging the base station 100 and the terminal device 200 and executing the same procedure, the base station 100 can select the optimum Tx beam of the terminal device 200.

On the other hand, an optimum reception beam (hereinafter, also called the Rx beam) can be selected on the basis of a measurement result obtained by receiving the measurement signal while beam sweeping. For example, the terminal device 200 transmits the measurement signal by uplink. Then, the base station 100 receives the measurement signal while beam sweeping (that is, switching the Rx beam), and determines an Rx beam which is most easily received. In this way, the optimum Rx beam of the base station 100 is selected. By exchanging the base station 100 and the terminal device 200 and executing the same procedure, the terminal device 200 can select the optimum Rx beam of the terminal device 200. In addition, reception while beam sweeping is also called beam sweeping reception below.

The side that receives and measures the measurement signal transmitted while beam sweeping reports the measurement result to the transmission side of the measurement signal. The measurement result includes information indicating a Tx beam which is optimal. The optimum Tx beam is, for example, a Tx beam having largest received power. The measurement result may include information indicating one Tx beam having the largest received power, or may include information indicating top K Tx beams having large received power. The measurement result includes, for example, identification information of the Tx beam (for example, an index of the beam) and information indicating the magnitude of the received power of the Tx beam (for example, reference signal received power (RSRP)) in association with each other.

The beam for beam sweeping is transmitted by giving directivity to the reference signal to be the known signal. Therefore, the terminal device 200 can discriminate the beam with a resource called the reference signal.

The base station 100 can provide one beam using the resource of one reference signal. That is, if 10 resources are prepared, the base station 100 can perform beam sweeping corresponding to 10 different directions. The 10 resources can be collectively called a resource set. One resource set including the 10 resources can provide beam sweeping corresponding to 10 directions.

(6) CSI Acquisition Procedure

A channel state information (CSI) acquisition procedure is executed after the optimum beam is selected by a beam selection procedure accompanied by the beam sweeping described above. By the CSI acquisition procedure, the channel quality in communication using the selected beam is acquired. For example, a channel quality indicator (CQI) is acquired in the CSI acquisition procedure.

The channel quality is used to determine a communication parameter such as a modulation system. If a modulation system that can send only a small number of bits even though the channel quality is good, for example, quadrature phase shift keying (QPSK) is adopted, the throughput becomes low. On the other hand, if a modulation system that can send many bits even though the channel quality is poor, for example, quadrature amplitude modulation (256QAM) is adopted, data reception fails on the reception side and the throughput becomes low. As described above, it is important to acquire the channel quality correctly for improving the throughput.

Figure 4:
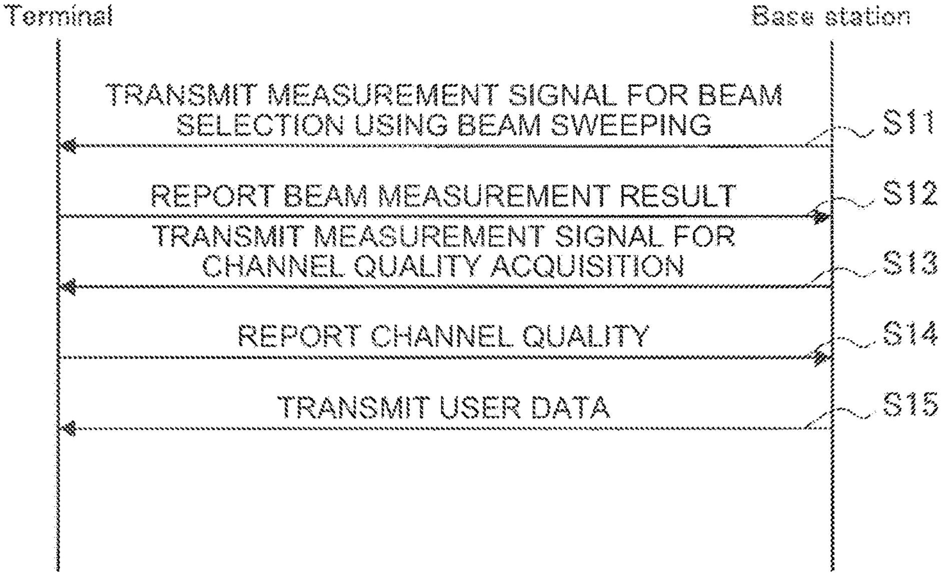
FIG. 4 is a sequence diagram illustrating an example of a flow of a typical beam selection procedure and CSI acquisition procedure executed by a base station and a terminal device.

FIG. 4 is a sequence diagram illustrating an example of a flow of a typical beam selection procedure and CSI acquisition procedure executed by the base station and the terminal device. As illustrated in FIG. 4, the base station transmits the measurement signal for beam selection using beam sweeping (step S11). Next, the terminal device measures the measurement signal for beam selection and reports a beam measurement result (beam report) to the base station (step S12). The measurement result includes, for example, information indicating the selection result of the optimum Tx beam of the base station. Next, the base station transmits a measurement signal for channel quality acquisition using the selected optimal beam (step S13). Next, the terminal device reports the channel quality acquired on the basis of the measurement result of the measurement signal to the base station (step S14). Then, the base station transmits user data to the terminal device using the communication parameter based on the reported channel quality (step S15).

The downlink channel quality is measured on the basis of the measurement signal transmitted by the downlink. On the other hand, the downlink channel quality can also be measured on the basis of the measurement signal transmitted by the uplink. This is because the uplink channel and the downlink channel have reversibility, and the quality of these channels is basically the same. The reversibility is also called channel reciprocity.

When the downlink channel quality is measured on the basis of the downlink measurement signal, the measurement result of the measurement signal for channel quality acquisition is reported as illustrated in step S14 of FIG. 4. The report of the measurement result can become a large overhead. A channel can be represented by an N×M matrix when the number of transmitting antennas is M and the number of receiving antennas is N. Each element of the matrix becomes a complex number corresponding to IQ. For example, when each I/Q is represented by 10 bits, the number of transmitting antennas is 100, and the number of receiving antennas is 8, 8×100×2×10=16000 bits are spent on reporting the channel quality measurement result, which leads to a large overhead.

On the other hand, when the downlink channel quality is measured on the basis of the uplink measurement signal, the measurement subject is the base station, so that it is not necessary to report the measurement result. Therefore, by measuring the downlink channel quality on the basis of the uplink measurement signal, it is possible to reduce the overhead related to reporting the measurement result and improve the throughput. A flow of processing when the downlink channel quality is measured on the basis of the uplink measurement signal will be described with reference to FIG. 5.

Figure 5:
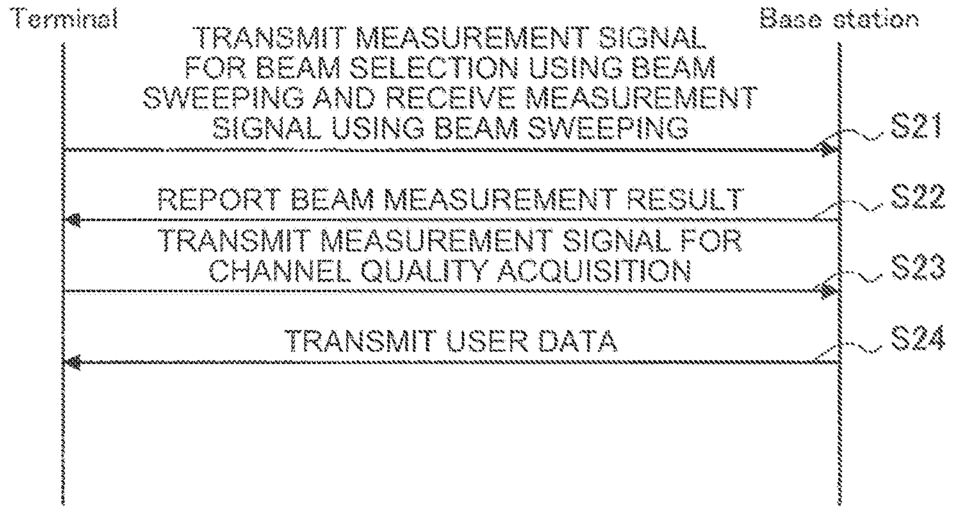
FIG. 5 is a sequence diagram illustrating another example of a flow of a typical beam selection procedure and CSI acquisition procedure executed by a base station and a terminal device.

FIG. 5 is a sequence diagram illustrating another example of a flow of a typical beam selection procedure and CSI acquisition procedure executed by a base station and a terminal device. As illustrated in FIG. 5, the terminal device transmits the measurement signal for beam selection using beam sweeping, and the base station receives the measurement signal while beam sweeping (step S21). At that time, the base station selects the optimum Tx beam of the terminal device and the optimum Rx beam of the base station, on the basis of a measurement result. Next, the base station reports the beam measurement result (beam report) to the terminal device (step S22). The measurement result includes information indicating a selection result of the optimum Tx beam of the terminal device. Next, the terminal device station transmits a measurement signal for channel quality acquisition using the selected Tx beam (step S23). The base station acquires the uplink channel quality on the basis of the measurement result, and acquires the downlink channel quality on the basis of the uplink channel quality. Then, the base station transmits the user data to the terminal device using the communication parameter based on the acquired downlink channel quality (step S24). From the above, in the beam report, the measurement result of the measurement signal for beam selection received by the base station or the terminal is transmitted to the terminal or the base station.

(7) Analogue-Digital Hybrid Antenna Architecture

In order to control the directivity of the antenna, an architecture in which all processing is performed by an analogue circuit is considered. The architecture is also called a fully digital architecture. In the fully digital architecture, as many antenna weights as antennas (that is, antenna elements) are applied in a digital region (that is, by a digital circuit) to control the directivity of the antenna. The antenna weight is a weight for controlling the amplitude and the phase. However, the full digital architecture has a disadvantage that the digital circuit becomes large. As an architecture that eliminates the disadvantage of the fully digital architecture, there is an analogue-digital hybrid antenna architecture.

Figure 6:
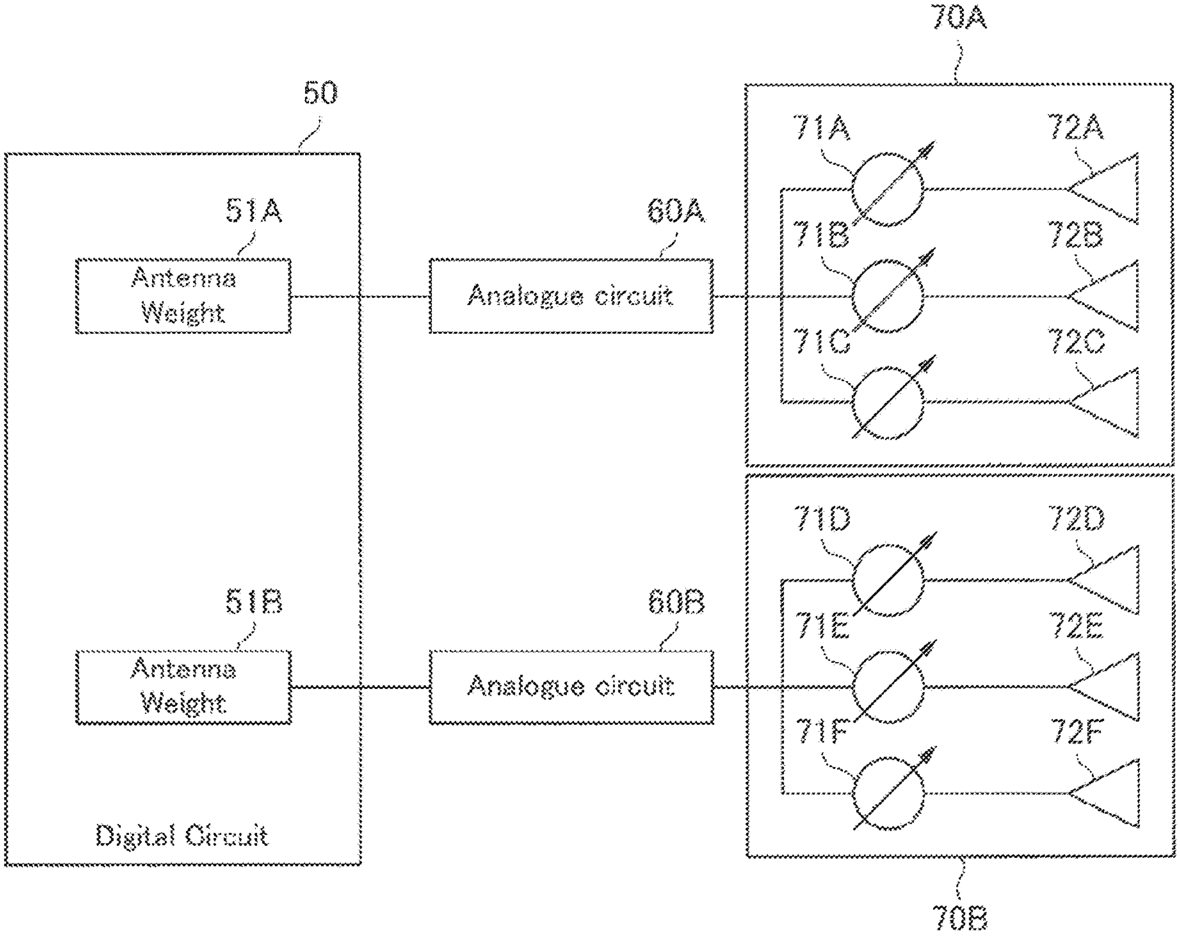
FIG. 6 is a diagram for explaining an example of an analogue-digital hybrid antenna architecture.

FIG. 6 is a diagram for explaining an example of an analogue-digital hybrid antenna architecture. The architecture illustrated in FIG. 6 includes a digital circuit 50, analogue circuits 60 (60A and 60B), and antenna panels 70 (70A and 70B). The digital circuit can apply a plurality of antenna weights 51 (51A and 51B). The analogue circuit 60 and the antenna panel 70 are provided in the same number as the number of antenna weights 51 applicable to the digital circuit 50. The antenna panel 70 is provided with a plurality of antennas 72 (72A to 72F) and phase shifters 71 (71A to 71F) of the same number as the number of antennas 72. The phase shifter 71 is a device that applies an antenna weight that can control only a phase in the analogue region.

The characteristics of the antenna weight in the digital region and the antenna weight in the analogue region are illustrated in the following Table 2.

TABLE 2

Characteristics of antenna weight in digital region and antenna weight in analogue region

| | Analogue region | Digital region |
|---|---|---|
| Controllable contents | Phase | Amplitude and phase |
| Analogue or digital? | Analogue | Digital |
| Application position is time region or frequency region? | Time region | In case of OFDM modulation system, antenna weight is applied in frequency region before FFT on transmission side, and antenna weight is applied in frequency region after IFFT on reception side |
| Different beams can be provided with different frequency resources of same time resources? | Impossible | Possible |

The antenna weight in the digital region is applied in the frequency region when an orthogonal frequency division multiplexing (OFDM) modulation system is used. For example, the antenna weight in the digital region is applied before inverse fast Fourier transform (IFFT) at the time of transmission and applied after fast Fourier transform (FFT) at the time of reception.

The antenna weight in the digital region is applied in the frequency region. Therefore, by applying the antenna weight in the digital region, it is possible to transmit beams in different directions using different frequency resources even if time resources are the same. On the other hand, the antenna weight in the analogue region is applied in the time region. Therefore, even if the antenna weight in the analogue region is applied, the beams can be directed only in the same direction over all frequency resources in the same time resources.

That is, for each antenna panel 70, the beams can be transmitted in different directions using different frequency resources even if the time resources are the same. On the other hand, one antenna panel 70 can direct the beams only in one direction using the same time resources and frequency resources. Therefore, in the analogue-digital hybrid antenna architecture, the directions of the beams that can be transmitted and received in the same time resources correspond to the number of antenna panels 70. Furthermore, in the analogue-digital hybrid antenna architecture, the number of beam groups capable of beam sweeping transmission or beam sweeping reception in the same time resources corresponds to the number of antenna panels 70. The analogue-digital hybrid antenna architecture can be adopted in both the base station 100 and the terminal device 200.

(8) Antenna Panel

In FIG. 6, the phase shifters of the three analogue regions are connected to the weight of one digital region. A set of the weight of one digital region and the phase shifters of the three analogue regions can be disposed together as an antenna panel. FIG. 6 illustrates an example in which an antenna panel includes three antenna elements and there are two antenna panels. As explained in Table 2, normally, in one panel, it is not possible to form beams in different directions using the different frequencies at the same time. However, if two panels are used, it is possible to form beams in different directions even at the same time. A configuration of the antenna panel is used on both the side of the base station and the side of the terminal.

Figure 7:
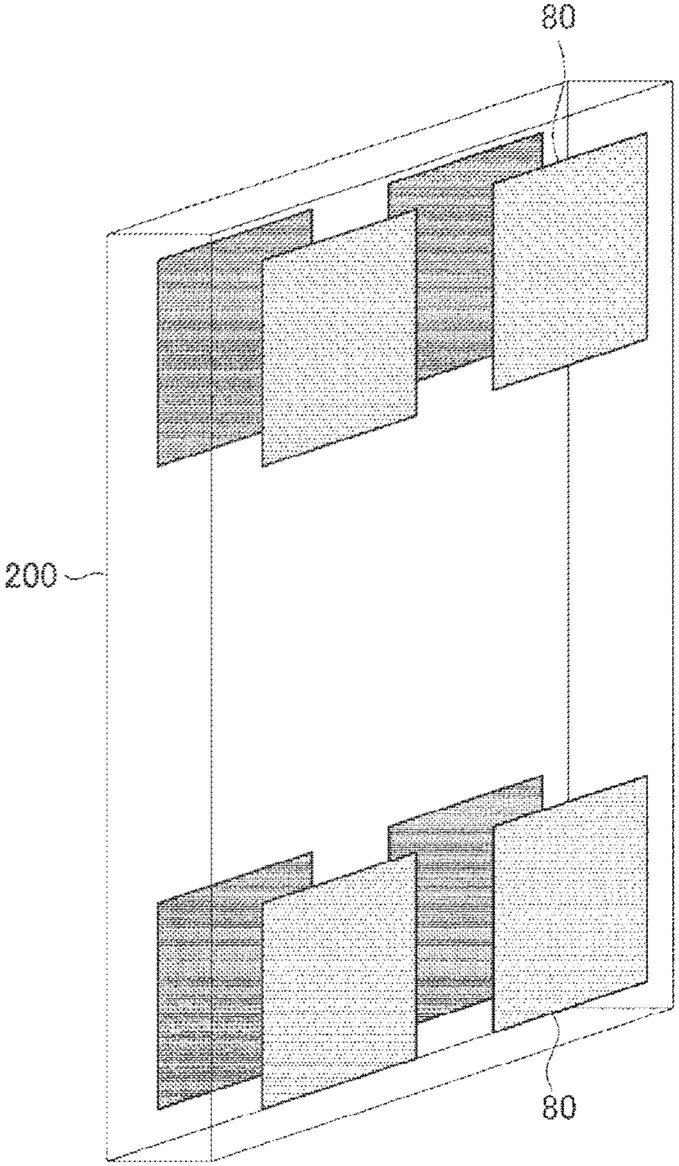
FIG. 7 is an explanatory diagram illustrating an arrangement example of antenna panels disposed in a terminal device.

FIG. 7 is an explanatory diagram illustrating an arrangement example of the antenna panels disposed in the terminal device 200. FIG. 7 illustrates an example in which eight antenna panels 80 are disposed in the terminal device 200. FIG. 7 illustrates an example in which four antenna panels 80 are disposed on each of a front surface and a back surface of the terminal device 200, that is, a total of eight antenna panels 80 are disposed. The number of antenna elements mounted on one antenna panel 80 is not limited to a specific number. For example, four antenna elements are mounted on one antenna panel 80.

(9) Reference Signal and User Data Resources

In order to perform the beam sweeping and the CSI acquisition procedure, it is necessary to transmit and receive a reference signal between the base station 100 and the terminal device 200. Further, when user data is transmitted and received between the base station 100 and the terminal device 200, it is necessary to transmit and receive the reference signal. The reference signal is basically specified by frequency and time resources, and some cases where resources are specified using orthogonal sequences are also included. On the other hand, for the user data, a scheduler included in a control signal specifies the frequency and time resources of the user data. In the case of the user data, the orthogonal sequences are not allocated as the resources. Only the frequency and time resources are used.

TABLE 3

For respective signal resources

| | Reference signal | Downlink Control signal | User Data |
|---|---|---|---|
| Resource type | Frequency, time, sequence | Frequency, time | Frequency, time |
| Allocation method | RRC signaling (semi-static), DCI (Dynamic) | Static (head of a slot) | Downlink control signal |

(10) Selection of Antenna Panel and Beam on Reception Side (10-1) Selection of antenna panel and beam at beam management stage During beam management, on the side of the terminal device 200, it is determined, by try and error, that an antenna panel which should receive the beam arriving from the base station 100 and the beam. The different antenna panels can be basically operated at the same time. Therefore, for example, when four resources are set as reference signal resources for the same beam for the downlink beam, the terminal device 200 can use four different reception beams for each antenna panel to determine which is a desired reception beam. Such an operation is performed for the number of downlink beams corresponding to different directions on the side of the base station 100. When the number of downlink beams is 10, the terminal device 200 observes the reception beam using 10×4=40 resources, so that it is possible to determine the desired beam from the base station 100, the antenna panel on the side of the terminal device 200, and the desired beam.

(10-2) Selection of antenna panel and beam at CSI procedure stage

The CSI procedure stage is a stage where the base station 100 uses precoding (finer antenna control) for transmission to confirm the quality of the channel in more detail. At the CSI procedure stage, the reference signal for the CSI procedure is received by the antenna panel of the terminal device 200 identified at the previous beam management stage and the beam determined to be most desirable in the antenna panel.

(11) Multi-base stations

The above is based on the premise that one base station 100 is equipped with a plurality of antenna panels. However, a case where a plurality of base stations 100 are disposed around the terminal device 200 is also considered. The terminal device 200 needs to acquire synchronization with a plurality of antenna panels of a plurality of terminal devices 200 (multi-base stations). The synchronization is both frequency synchronization and time synchronization. The multi-base stations in this case are assumed to have the same cell ID. Therefore, although the cells are the same when viewed from the terminal device 200, physically different base stations 100 actually transmit and receive signals.

(12) Synchronization signal

The synchronization signal is a block including a continuous synchronization signal called an SS burst set, and a plurality of (for example, eight) synchronization signal blocks (SSBs) are included therein. Two SSBs can be included in one slot including 4OFDM Symbols, and a maximum of four slots can be set. Then, the number of SSBs becomes eight.

One SSB includes a synchronization sequence called PSS/SSS and an area called PBCH that provides system information, and each SSB is sent with a beam directed in a different direction. That is, the synchronization signal and the broadcast system information are included in the beams corresponding to different directions. The SS burst can set synchronization, and can set a value such as 5 ms or 20 ms, for example.

1.3. Outline of Proposed Technology

The conventional beamformed synchronization signals and PBCH (system information) have a configuration in which it is not assumed that the synchronization signals and PBCH are transmitted from a plurality of antennas of a plurality of base stations (see 3GPP TS38.211, TS38.213). Therefore, in an environment of the plurality of antenna panels of the plurality of base stations, if the beamformed synchronization signal and PBCH are transmitted from the base station, the load of the terminal device at the time of reception increases.

Specifically, since the conventional synchronization signal does not consider the plurality of antenna panels of the plurality of base stations, the terminal device needs to repeat the synchronization signal acquisition procedure many times. For example, when each of N (N is, for example, about 3 to 10) base stations includes M (M is, for example, about 2 to 4) antenna panels, the terminal device should repeat the synchronization signal acquisition procedure up to N×M times. A specific example will be given. When the number of base stations is 3 and the number of antenna panels provided in each base station is 4, the terminal device needs to monitor the synchronization signals transmitted from 12 nearby locations and acquire the optimum synchronization signal. If the terminal device moves, it is necessary to update the synchronization signals to be monitored, and even if the terminal device does not move, it is necessary to constantly update the synchronization signals for a case where the optimum beam is blocked by blocking by a vehicle or a person. This is a huge burden on the terminal device.

The terminal device simply determine the SSB which transmits the large signal among SSBs before acquiring the Cell ID by using synchronization sequences of PSS and SSS, and observes an SSB with the large signal many times with a repetition cycle of 20 ms. Then, the terminal device observes which of PSS/SSS sequence combinations is applicable. Performing such an operation a plurality of times is a huge burden on the terminal device.

2. CONFIGURATION EXAMPLE

2.1. Configuration Example of Base Station

Figure 8:
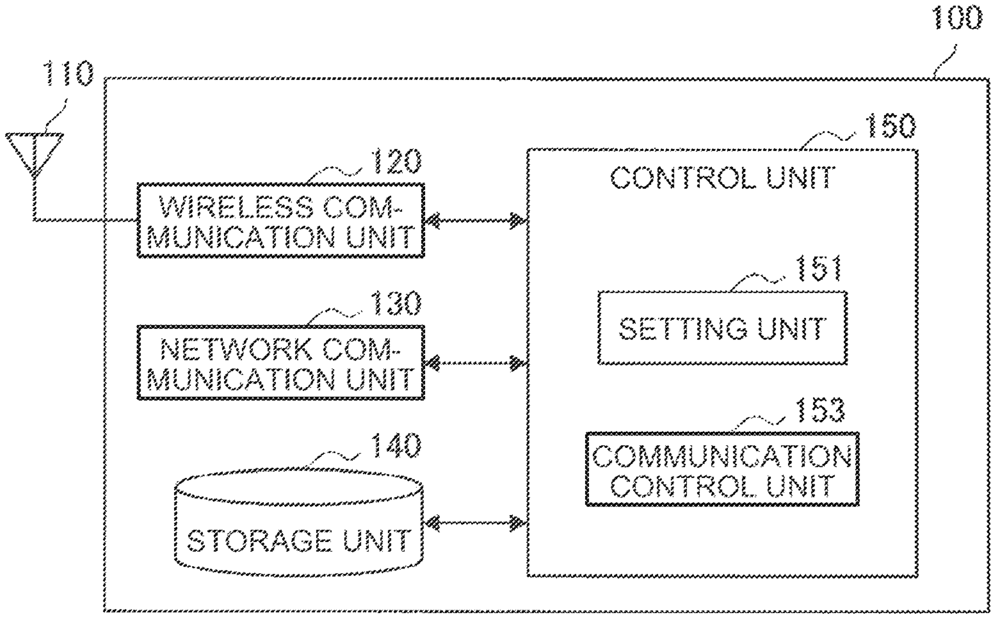
FIG. 8 is a block diagram illustrating an example of a configuration of a base station according to the present embodiment.

FIG. 8 is a block diagram illustrating an example of a configuration of the base station 100 according to the present embodiment. Referring to FIG. 8, the base station 100 includes an antenna unit 110, a wireless communication unit 120, a network communication unit 130, a storage unit 140, and a control unit 150.

(1) Antenna unit 110

The antenna unit 110 radiates the signal output by the wireless communication unit 120 into a space as a radio wave. Further, the antenna unit 110 converts the radio wave in the space into a signal and outputs the signal to the wireless communication unit 120.

In particular, in the present embodiment, the antenna unit 110 has a plurality of antenna elements and can form a beam.

(2) Wireless Communication Unit 120

The wireless communication unit 120 transmits and receives a signal. For example, the wireless communication unit 120 transmits a downlink signal to the terminal device and receives an uplink signal from the terminal device.

In particular, in the present embodiment, the wireless communication unit 120 can form a plurality of beams by the antenna unit 110 and communicate with the terminal device.

Here, in the present embodiment, the antenna unit 110 and the wireless communication unit 120 are configured to include the plurality of antenna panels 70 of the analogue-digital hybrid antenna architecture described above with reference to FIG. 6. For example, the antenna unit 110 corresponds to the antenna 72. Further, for example, the wireless communication unit 120 corresponds to the digital circuit 50, the analogue circuit 60, and the phase shifter 71.

(3) Network Communication Unit 130

The network communication unit 130 transmits and receives information. For example, the network communication unit 130 transmits information to other node and receives information from other node. For example, other node includes other base station and core network node.

(4) Storage Unit 140

The storage unit 140 temporarily or permanently stores programs and various data for the operation of the base station 100.

(5) Control Unit 150

The control unit 150 controls the operation of the entire base station 100 and provides various functions of the base station 100. In the present embodiment, the control unit 150 is configured to include a setting unit 151 and a communication control unit 153.

The setting unit 151 performs various settings related to wireless communication between the base station 100 and the terminal device 200. In particular, in the present embodiment, the setting unit 151 performs various settings for efficiently measuring the synchronization signal from the base station 100 by the terminal device 200, as described below. The communication control unit 153 executes communication control processing for transmitting a signal from the wireless communication unit 120 on the basis of the setting of the setting unit 151.

The control unit 150 can further include other components other than these components. That is, the control unit 150 can perform operations other than the operations of these components.

2.2. Configuration Example of Terminal Device

Figure 9:
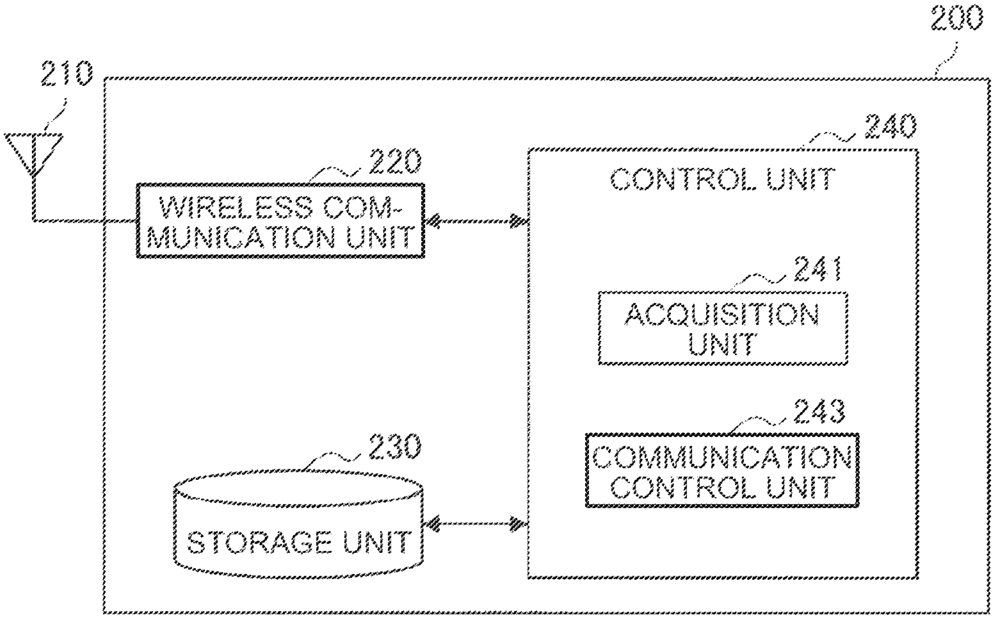
FIG. 9 is a block diagram illustrating an example of a configuration of a terminal device according to the present embodiment.

FIG. 9 is a block diagram illustrating an example of a configuration of the terminal device 200 according to the present embodiment. Referring to FIG. 9, the terminal device 200 includes an antenna unit 210, a wireless communication unit 220, a storage unit 230, and a control unit 240.

(1) Antenna Unit 210

The antenna unit 210 radiates the signal output by the wireless communication unit 220 into the space as a radio wave. Further, the antenna unit 210 converts the radio wave in the space into a signal and outputs the signal to the wireless communication unit 220. In particular, in the present embodiment, the antenna unit 210 has a plurality of antenna elements and can form a beam.

(2) Wireless communication unit 220

The wireless communication unit 220 transmits and receives a signal. For example, the wireless communication unit 220 receives the downlink signal from the base station and transmits the uplink signal to the base station.

In particular, in the present embodiment, the wireless communication unit 220 can form a plurality of beams by the antenna unit 210 and communicate with the base station. Here, in the present embodiment, the antenna unit 210 and the wireless communication unit 220 are configured to include the plurality of antenna panels 70 of the analogue-digital hybrid antenna architecture described above with reference to FIG. 6. For example, the antenna unit 210 corresponds to the antenna 72. Further, for example, the wireless communication unit 220 corresponds to the digital circuit 50, the analogue circuit 60, and the phase shifter 71.

(3) Storage Unit 230

The storage unit 230 temporarily or permanently stores programs and various data for the operation of the terminal device 200.

(4) Control Unit 240

The control unit 240 controls the operation of the entire terminal device 200 and provides various functions of the terminal device 200. In the present embodiment, the control unit 240 is configured to include an acquisition unit 241 and a communication control unit 243.

The acquisition unit 241 acquires the information transmitted from the base station 100 by wireless communication between the base station 100 and the terminal device 200. In particular, in the present embodiment, the acquisition unit 241 acquires various information for efficiently measuring the synchronization signal from the base station 100 by the terminal device 200, as described below. The communication control unit 243 executes communication control processing for transmitting a signal from the wireless communication unit 220 on the basis of the information acquired by the acquisition unit 241.

The control unit 240 can further include other components other than these components. That is, the control unit 240 can perform operations other than the operations of these components.

3. FIRST EMBODIMENT

Figure 10:
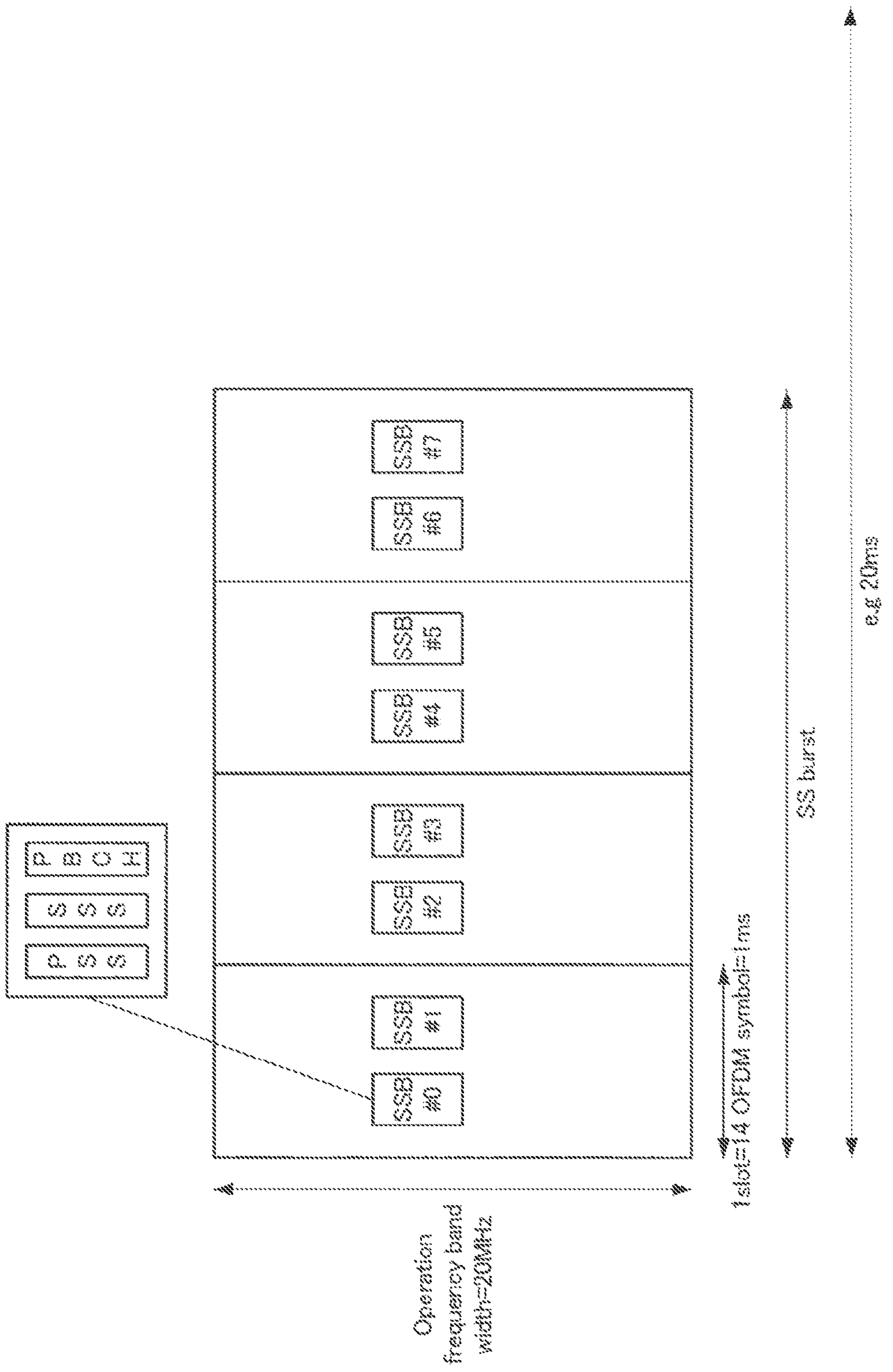
FIG. 10 is an explanatory diagram illustrating an example in which SSBs are arranged in a time direction.

As illustrated in FIG. 10, a case where SSBs are disposed in a time direction using the same PSS/SSS from the base stations 100 belonging to the same cell is considered. The terminal device 200 does not notice existence of a plurality of base stations 100, and simply view received powers of eight SSBs to report an SSB with large received power. This is effective when the same Cell ID is allocated to different base stations 100 and the terminal side is not aware that the different base stations 100 exist. However, this method has a problem when the terminal device 200 is aware of a plurality of base stations 100 and desires to connect to two base stations 100. For example, this is because, even if the terminal device 200 is set to make a report from two base stations 100, it is highly likely that two strong SSBs of only one base station 100 will be selected.

Therefore, in the present embodiment, the SSBs (synchronization signals) of the base stations 100 having the same Cell ID are set as one SS burst, an SSB in the SS burst and the base station to which the SSB belongs are specified, and setting for causing the terminal device 200 to make a beam report is performed.

Further, in the present embodiment, setting is performed to limit the number of reports so that the terminal device 200 can determine the maximum number of base stations 100 to be reported from the base stations 100 having the same Cell ID each time and perform reporting.

A specific example will be described below. For example, an SSB among the eight SSBs and a base station 100 to which the SSB belongs are set to the terminal device 200 from the network side by RRC signaling or the like. A conventional report configuration corresponds to SS burst reporting configuration (0), and the terminal device 200 selects and reports the SSB with the strong received power from the eight SSBs. The SS burst Reporting Configuration corresponding to the antenna panel of each base station 100 is set to this. For example, SS burst reporting configuration (1) or (2) is set. With this setting, the terminal device 200 can report the quality of the antenna panel in each base station 100.

In this configuration, in the initial access, after the terminal device 200 is connected to one of the base stations 100, the setting is performed by the RRC signaling. That is, this method is not used at the time of connecting to the first cell from RRC idle. For example, in communication of the 2 GHz band, a macro cell is selected by a normal cell connection method. After that, when a small base station 100 is selected for communication of the 27 GHz band or the like, the terminal device 200 selects the base station 100 and the antenna panel on the basis of this setting information.

Figure 11:
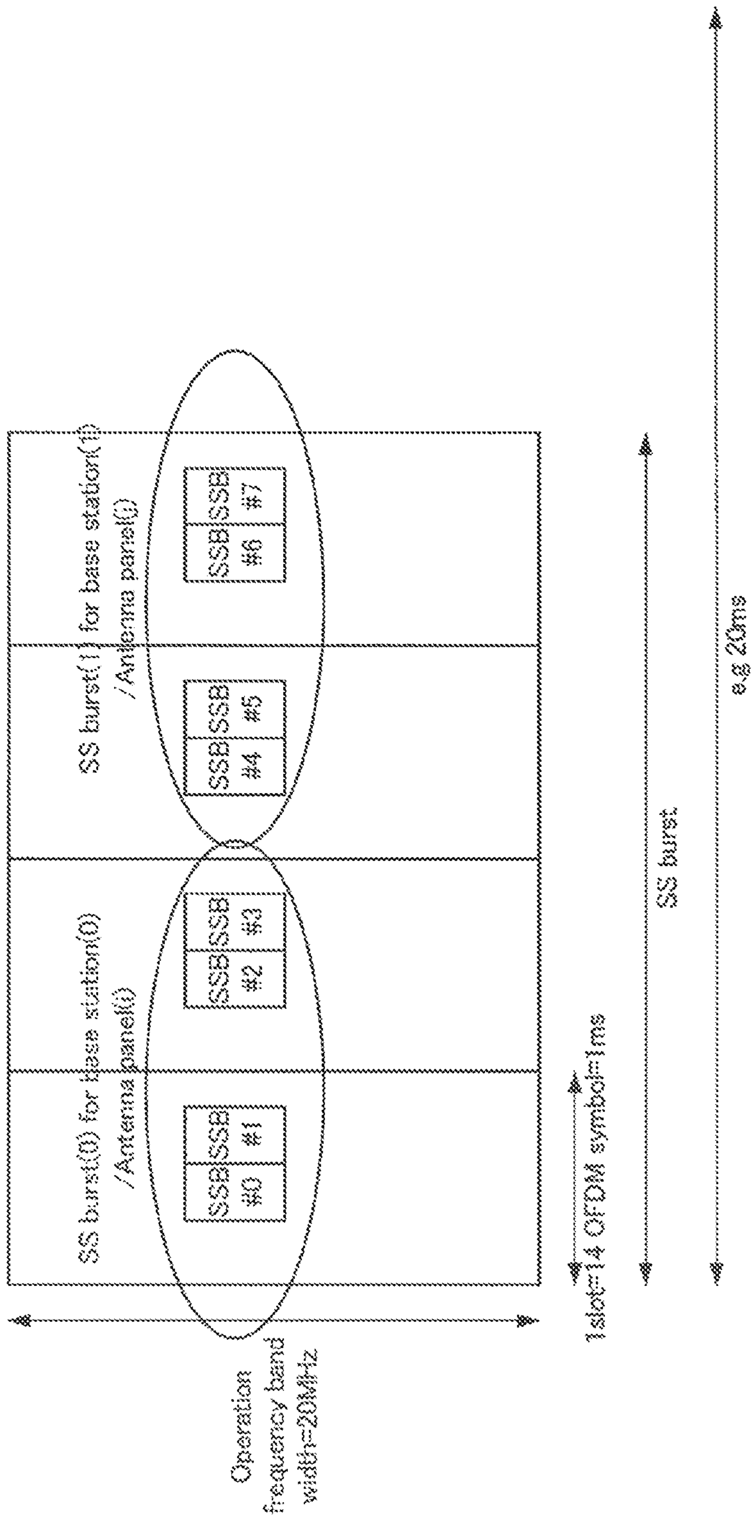
FIG. 11 is an explanatory diagram illustrating an example in which a plurality of SS burst reporting configurations are set in a terminal device.

When this method is used and a large number of base stations 100 exist around the terminal device 200, reporting may be performed for all antenna panels of all base stations 100, but the number of reports may be limited. That is, in reporting an SSB set as arriving from a different base station 100, the number of base stations 100 to be reported may be set in the terminal device 200. This is not just to perform the report configuration a plurality of times, and for example, 10 SS burst reporting configurations may be set, and the terminal device 200 may be set to make reports corresponding to a maximum of three base stations 100 among ten base stations. The terminal can determine to select the three base stations from the ten base stations on the basis of the received power of the terminal device 200. FIG. 11 is an explanatory diagram illustrating an example in which a plurality of SS burst reporting configurations are set in the terminal device 200.

Figure 12:
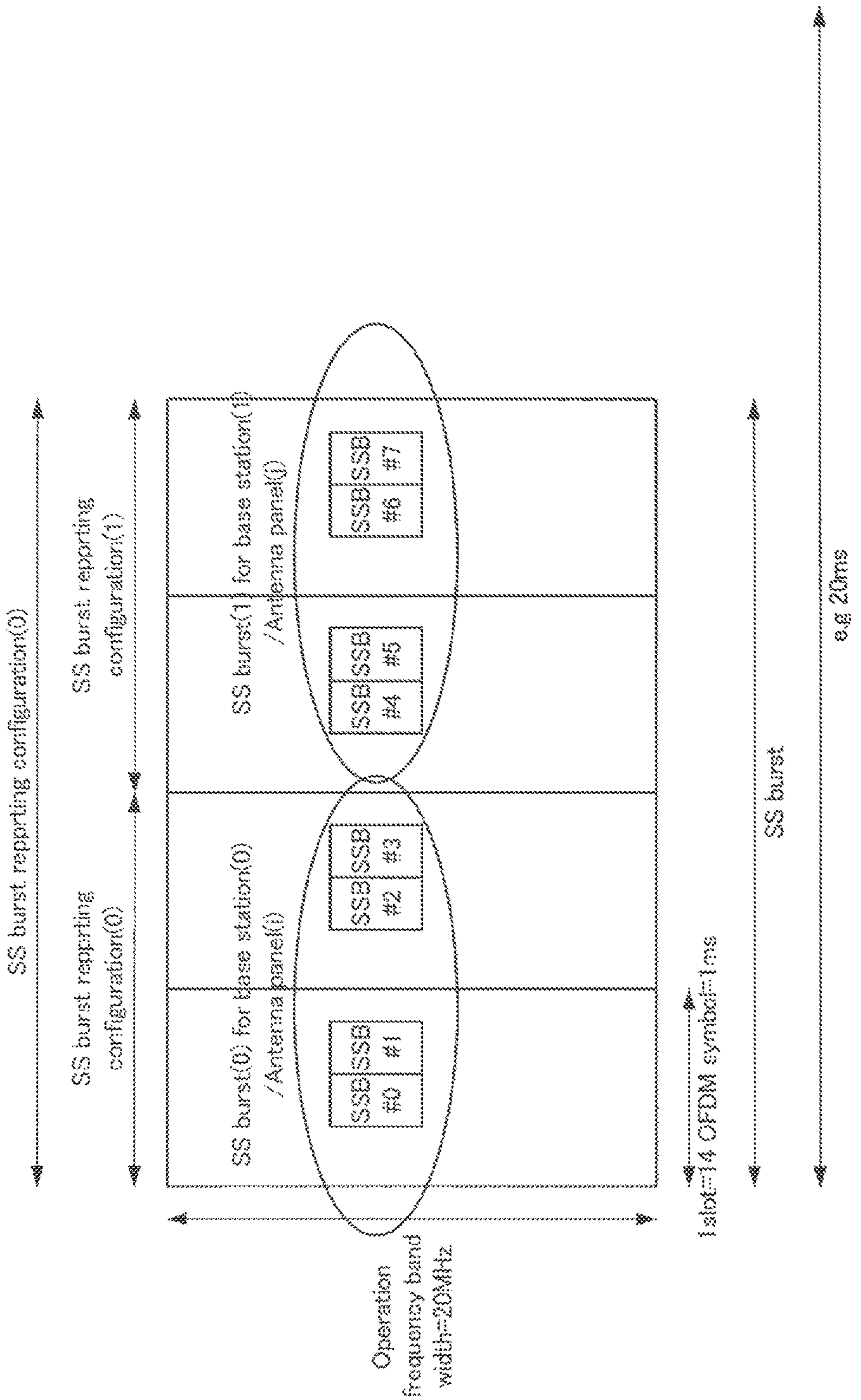
FIG. 12 is an explanatory diagram illustrating an example of a boundary of a range of a report.

In many cases, the setting of the report is performed by dedicated signaling for each terminal device 200, but the base station 100 may notify a target of the report by using broadcasting such as PBCH. For example, each SSB includes PBCH as illustrated in FIG. 11. Therefore, if PBCH includes instructions such as report group1 and report group2, the base station 100 can inform the terminal device 200 of a boundary of a range of the report as illustrated in FIG. 12.

In the present embodiment, the random access can be applied to both contention based random access and non-contention based random access. This is because an object of the present embodiment is to clarify a range of targets to be compared in the report.

According to the present embodiment, by using a plurality of beams arriving from different base stations 100 having the same cell ID, the terminal device 200 can select a desired beam from the beams transmitted by the respective base stations 100 and perform reporting. According to the present embodiment, since the terminal device 200 can select the optimum beam of the plurality of base stations 100 from a series of beams, an operation rate of the terminal device 200 can be lowered, and power consumption of the terminal device 200 can be reduced.

4. SECOND EMBODIMENT

Normally, in the terminal device 200, one random access is set for setting of X SSBs. The random access is a procedure in which the terminal device 200 requests the base station 100 to perform connection on a connection basis, and is a procedure in which a sequence called a preamble is sent from the terminal device 200 on a connection basis without scheduling in order to measure a delay time between the terminal device 200 and the base station 100.

This setting is problematic in an environment where many base stations 100 are disposed around the terminal device 200 and the terminal device 200 is connected to a plurality of base stations 100 at the same time. This is because, when the resources of the plurality of base stations 100 are included in one SSB setting, there is only one random access resource. The reason why SSBs from the plurality of base stations 100 are included in one SSB setting is described above, but this is because the plurality of base stations are base stations having the same Cell ID, and should be handled by one SSB setting to be regarded as the same cell from the terminal device 200.

Therefore, in the present embodiment, when SSBs in the SS burst are linked to a plurality of base stations 100, an uplink resource for random access is set for each base station 100. Further, when the SSBs in the SS burst are linked to the plurality of base stations 100, an uplink resource for common random access is set for each base station 100. A message part following the preamble sequence sent by the uplink resource for common random access allows the network side to determine the base station 100 which corresponds to the random access. The preamble sequence sent by the uplink resource for common random access may allow the network side to determine which base station 100 the random access is for.

Further, in the present embodiment, uplink resources for random access for a plurality of base stations 100 having the same Cell ID can be prepared for the number of base stations 100, and a linkage thereof can be set for each terminal device 200. When the terminal device 200 fails in random access, it is possible to set an area for executing the second try in the above uplink resources.

Figure 13:
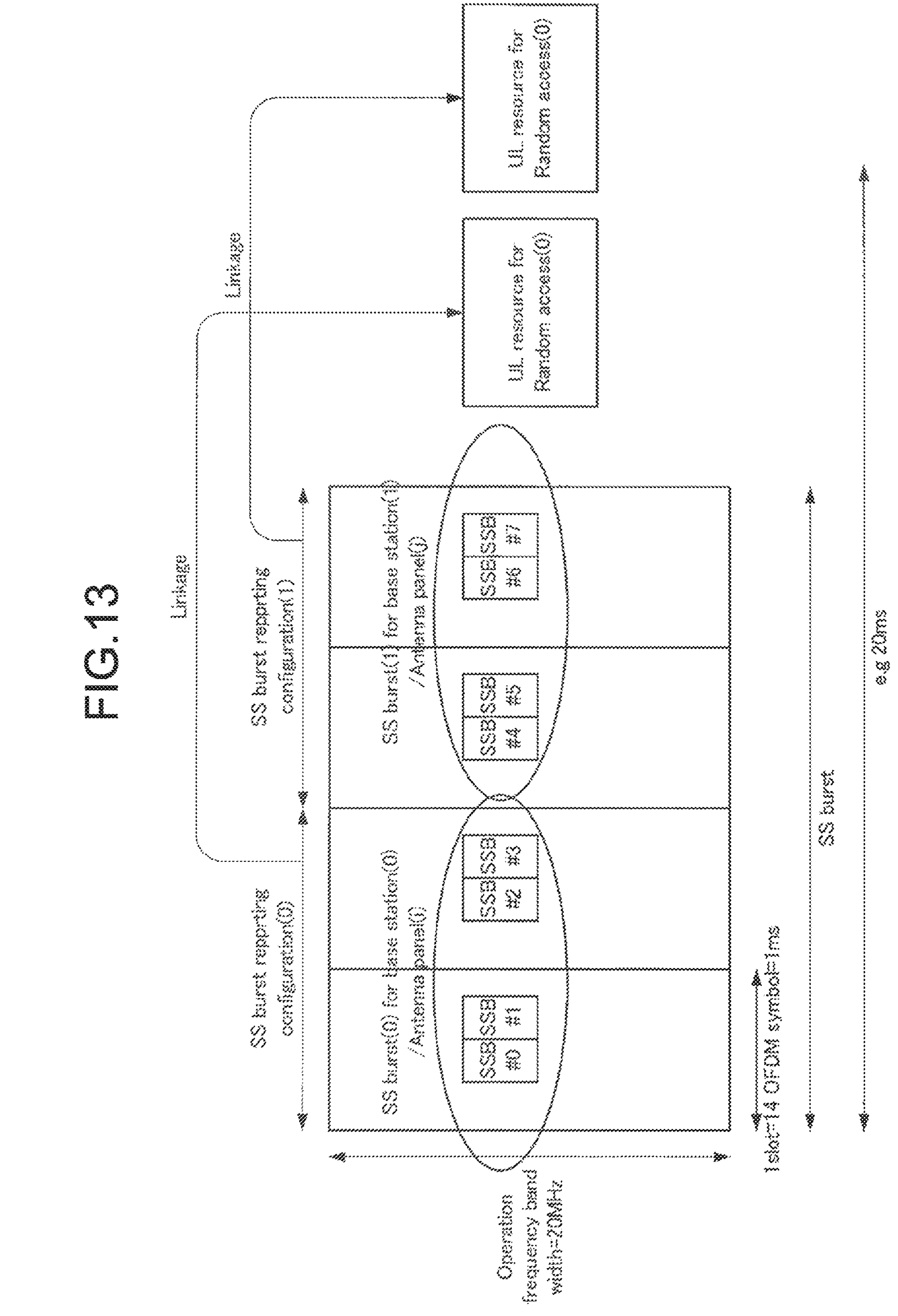
FIG. 13 is an explanatory diagram illustrating an example of a linkage between resources.

A specific example is illustrated. In the present embodiment, one SS burst set is divided into a plurality of parts. Specifically, as illustrated in FIG. 13, SSBs corresponding to a plurality of base stations 100 are specified in the settings, and contents thereof are set in the terminal device 200. The uplink resources that perform random access to a plurality of SSB areas are prepared for the number of SSB areas, a linkage between the resources is specified, and contents thereof are set in the terminal device 200.

Figure 14:
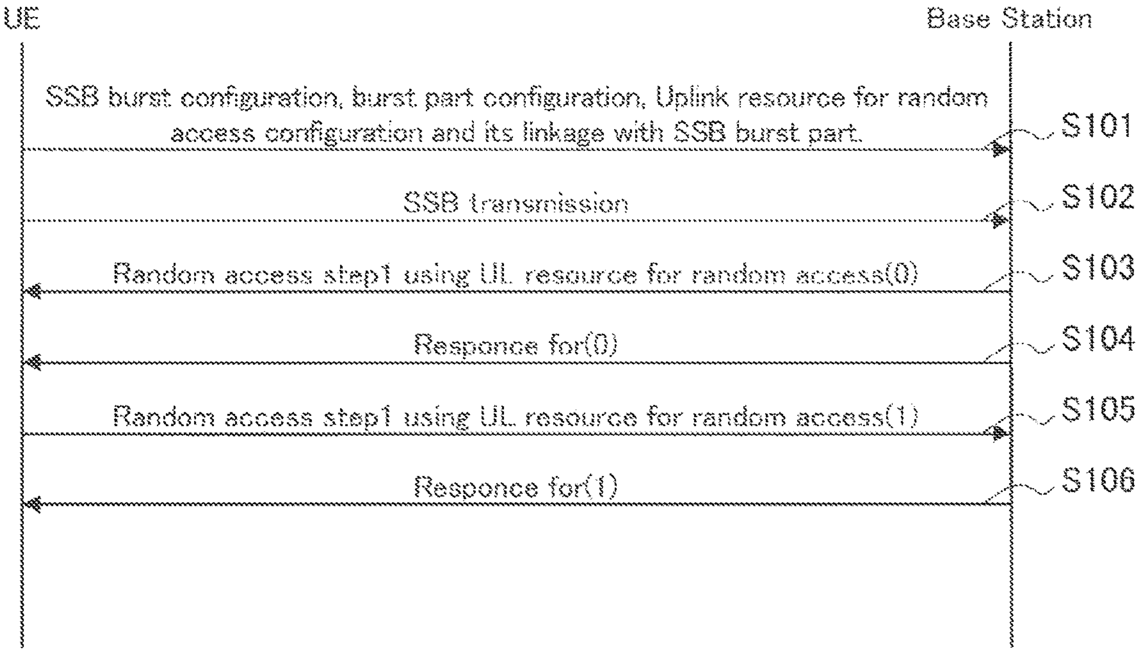
FIG. 14 is an explanatory diagram illustrating a random access procedure of four steps.

FIG. 14 is an explanatory diagram illustrating a random access procedure of four steps. FIG. 14 assumes a sequence in which random access is completed in two steps. First, the base station 100 transmits, to the terminal device 200, a configuration of the SS burst, a configuration of the SS burst part, a configuration of the uplink resource for random access, and a configuration of the linkage between the SS burst part and the resources (step S101).

Subsequently, the base station 100 transmits the SSB (step S102). Upon receiving the SSB, the terminal device 200 executes step 1 of random access using the uplink resource No. 0 for random access (step S103).

The base station 100 transmits a response to the random access in step S103 to the terminal device 200 (step S104). Upon receiving the response, the terminal device 200 subsequently executes step 1 of random access using the uplink resource No. 1 for random access (step S105). The base station 100 transmits a response to the random access in step S104 to the terminal device 200 (step S106).

Even if the cell ID of the base station 100 is the same, the probability of a report collision from the terminal device 200 can be reduced by preparing resources for the report from the terminal device 200 for each of the base stations 100. Therefore, the present embodiment is effective for contention based random access.

Since the contention based random access is performed, it may collide with an uplink random access signal of other terminal device 200, and the random access signal of the terminal device 200 may not be detected on the network side. When there are four base stations 100 with the same Cell ID and the terminal device 200 is set to connect to two base stations 100, four uplink resources are prepared for random access, and each uplink resource is linked to the four base stations 100. The terminal device 200 that has determined to randomly access the first base station 100 and the second base station 100 uses the uplink resources of the first base station 100 and the second base station 100 to try random access. However, a collision with random access of other terminal device 200 may be caused. In this case, the terminal device 200 can continue random access only to the two base stations 100, even though there are the four resources.

Figure 15:
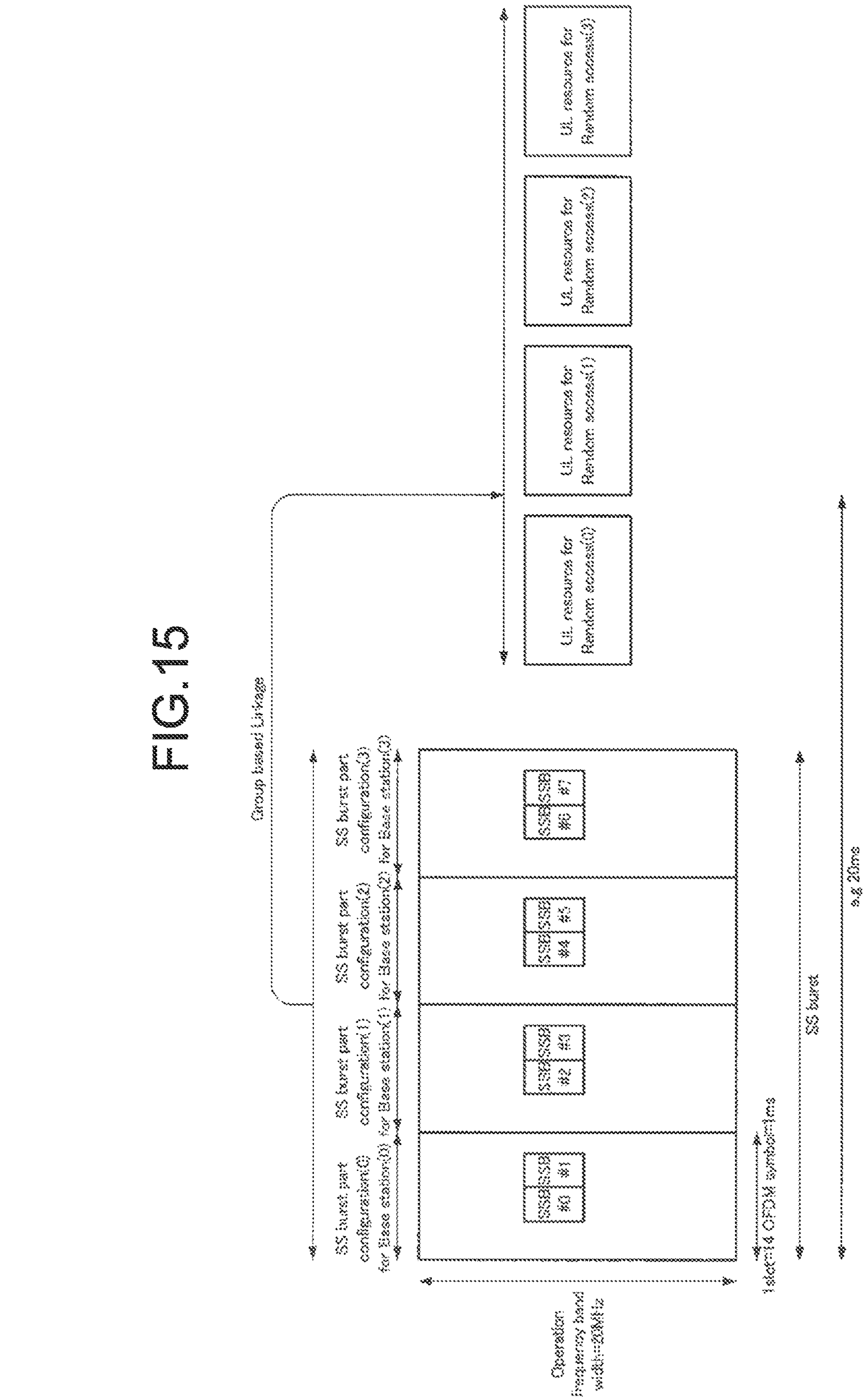
FIG. 15 is an explanatory diagram illustrating a linkage of uplink resources.

Therefore, in the present embodiment, instead of linking to each of the four base stations 100, random access may be performed to the four uplink resources. That is, the four uplink resources are configured as one group and a linkage is set to the group. FIG. 15 is an explanatory diagram illustrating a linkage of uplink resources, and is an example in which four uplink resources are configured as one group and a linkage is set to the group.

Figure 16:
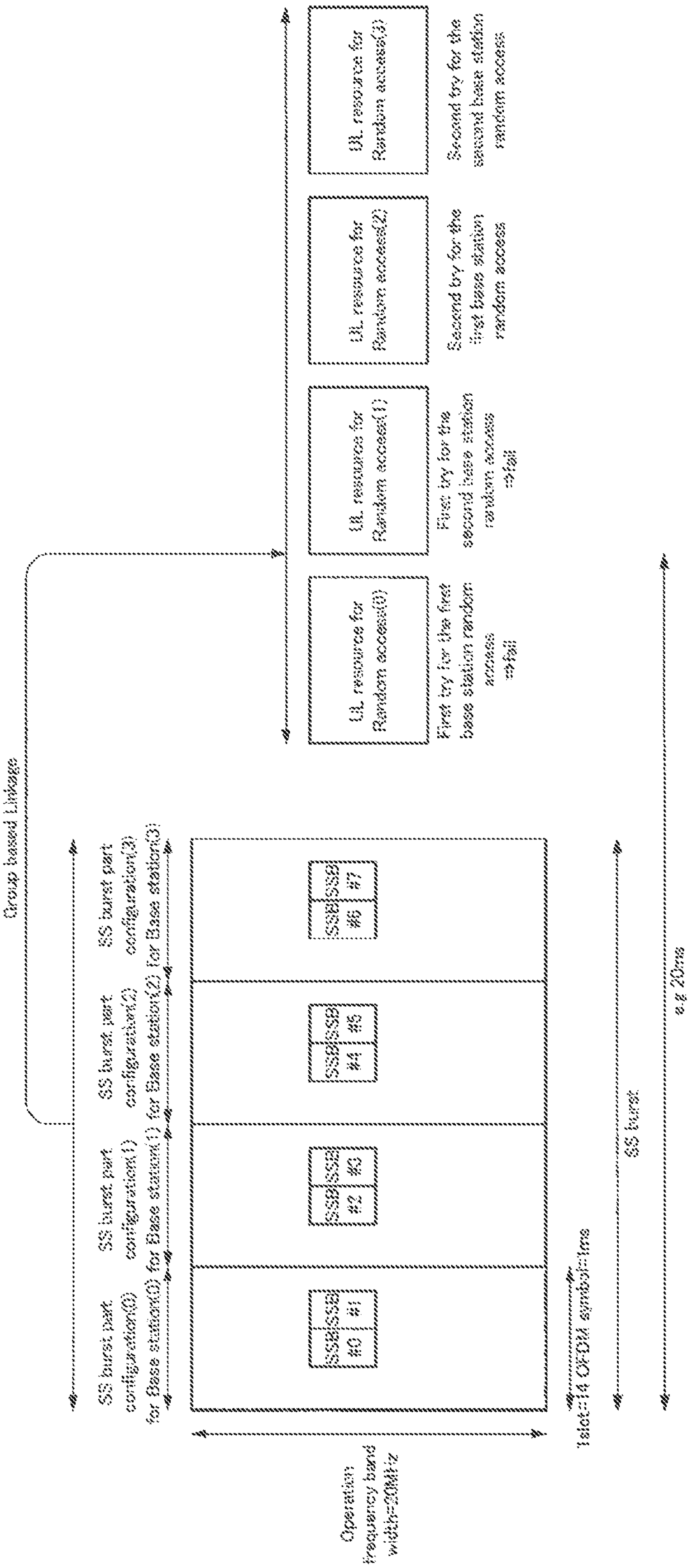
FIG. 16 is an explanatory diagram illustrating a linkage of resources.

FIG. 16 is an explanatory diagram illustrating an example of a linkage of resources. FIG. 16 illustrates a case where, when four base stations 100 exist and the number of random accesses that may be performed is set as 2 to the terminal device 200, the base station 100 identified by the terminal device 200 as having the highest quality among the four base stations 100 is set as the first base station, and the base station 100 identified by the terminal device 200 as having the second highest quality is set as the second base station. For each base station 100, two random access chances are allocated to the terminal device 200. When the terminal device 200 fails in the first random access, it is possible to try random access with the resource of the second random access.

Figure 17:
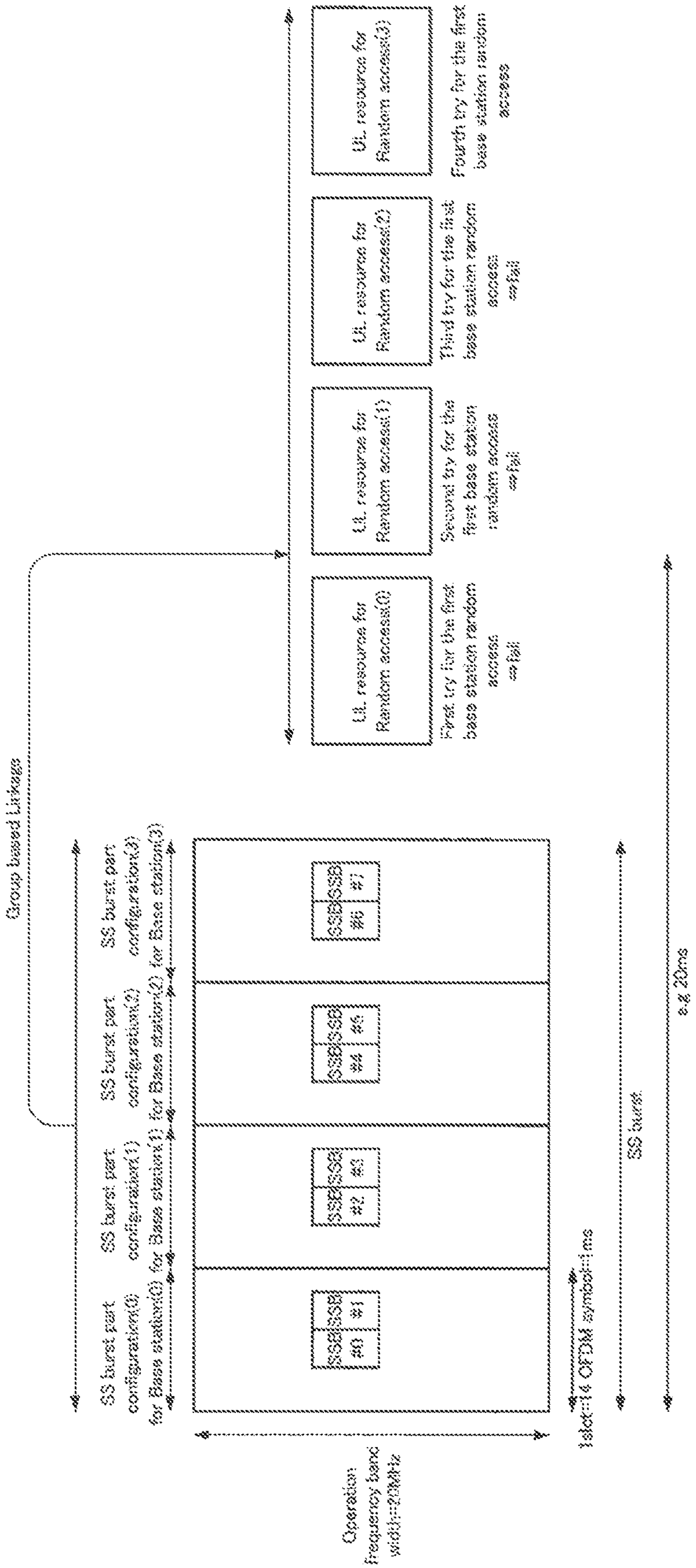
FIG. 17 is an explanatory diagram illustrating a linkage of resources.

FIG. 17 is an explanatory diagram illustrating an example of a linkage of resources. FIG. 17 illustrates an example of a case in which four base stations 100 exist, and the number of random accesses that may be performed is set as 1 to the terminal device 200. In this case, four random access chances are allocated. Of course, the terminal device 200 does not have to perform random access all four times, and when there is a response from the network side of step 2 in the random access procedure of two steps, the remaining tries are not necessary.

In a case of traffic that requires high reliability and low delay such as URLLC, it is important to prevent uplink collisions at the time of random access and delay in procedures. In the present embodiment, it is possible to reduce the delay of the procedure due to the collision by the contention at the time of random access. That is, the present embodiment is effective for contention based random access.

Figure 18:
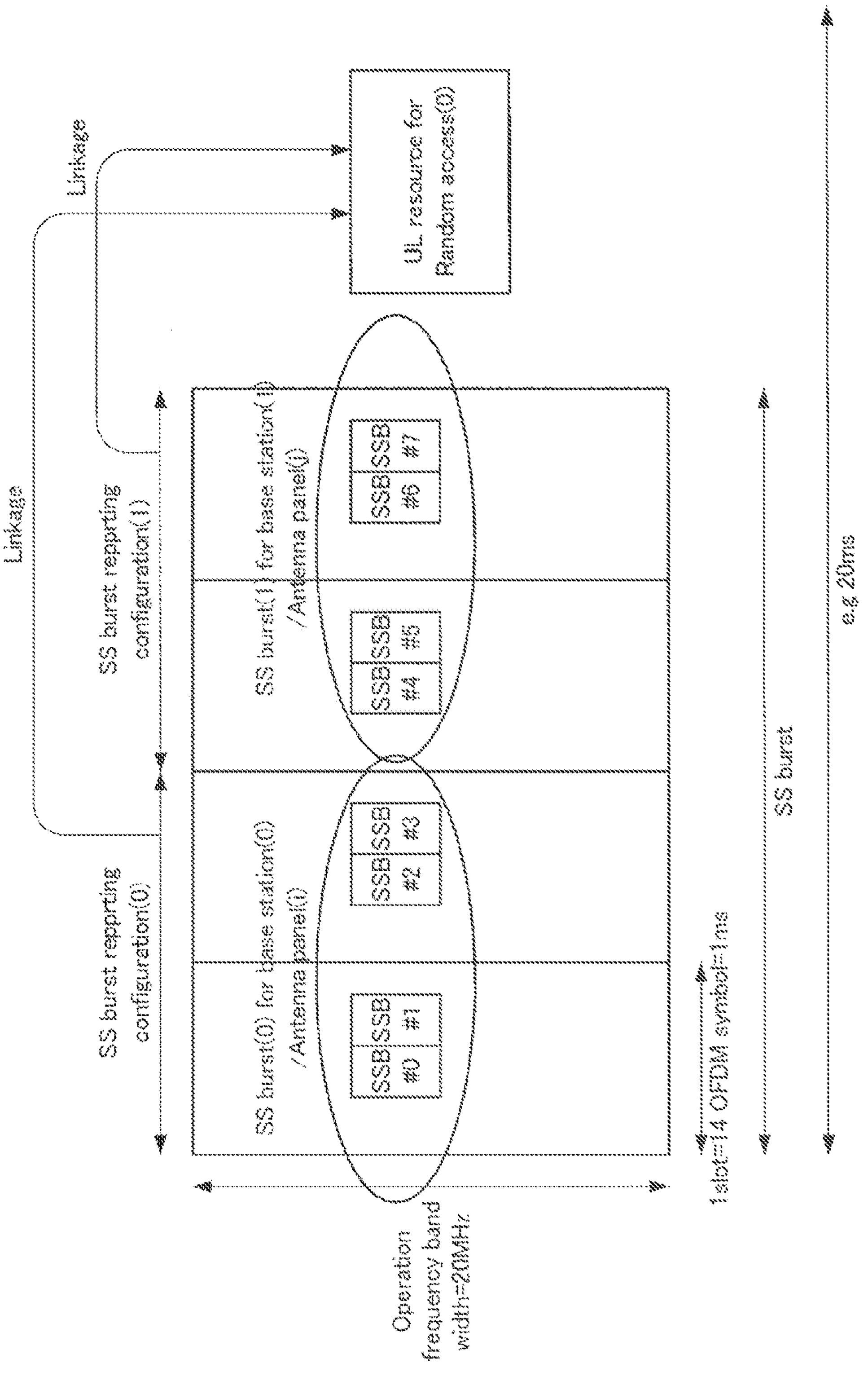
FIG. 18 is an explanatory diagram illustrating an example of a linkage of resources.
Figure 19:
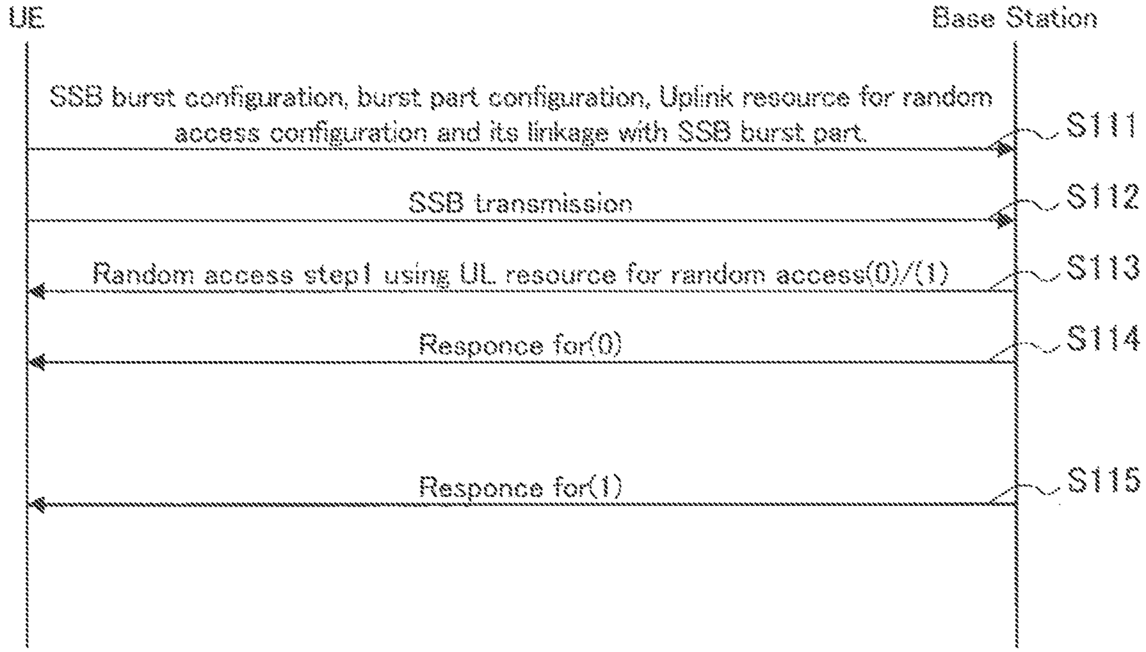
FIG. 19 is an explanatory diagram illustrating a random access procedure.

FIG. 18 is an explanatory diagram illustrating an example of a linkage of resources when one uplink resource is used. FIG. 19 is an explanatory diagram illustrating a random access procedure in the case of the linkage illustrated in FIG. 18.

First, the base station 100 transmits, to the terminal device 200, a configuration of the SS burst, a configuration of the SS burst part, a configuration of the uplink resource for random access, and a configuration of the linkage between the SS burst part and the resources (step S111).

Subsequently, the base station 100 transmits the SSB (step S112). Upon receiving the SSB, the terminal device 200 executes step 1 of random access using the uplink resources Nos. 0 and 1 for random access (step S113).

The base station 100 transmits a response to the random access in step S113 to the terminal device 200 (steps S114 and S115).

In the case of the sequence illustrated in FIG. 19, the terminal device 200 notifies the network side of SS burst part which is accessed in Step 1 of random access using uplink resources by a message following the preamble of the random access or a random access preamble sequence. This is to avoid the terminal device 200 from receiving an unexpected number of responses or receiving an unexpected response from the base station 100.

In a method for representing the corresponding base station in the random access sequence in Step 1, for example, if a sequence number used by the terminal is X, a sequence of X+0 is used for random access corresponding to only the base station (0), and a sequence of X+1 is used for random access corresponding to the base station (1). For random access that is performed on the base station (0) and the base station (1) at the same time, a promise such as using the sequence of X+2 is made on the network side and the terminal.

TABLE 4

Example of sequence for random access of base stations having same Cell ID

| Sequence ID | |
|---|---|
| X | Sequence of step 1 of random access for only base station (0) |
| X + 1 | Sequence of step 1 of random access for only base station (1) |
| X + 2 | Sequence of step 1 of random access for both base station (0) and B base station (1) |

In reality, performing notification by the message part following the preamble of the random access may be a simple method. However, a method illustrated in Table 4 is more tolerant of collisions with random access messages transmitted by other terminal devices 200. Of course, a method in which, although the tolerance is low, notification is performed by a message part which is a part following the preamble may be used. This method is effective when the number of base stations 100 is large and the number of reports from the terminal device 200 may be smaller than the number of base stations 100.

5. APPLICATION EXAMPLE

The technology according to the present disclosure can be applied to various products.

For example, the base station 100 may be realized as any type of evolved Node B (eNB) such as a macro eNB or a small eNB. The small eNB may be an eNB that covers cells smaller than the macro cell, such as a pico eNB, a micro eNB, or a home (femto) eNB. Instead, the base station 100 may be realized as another type of base station such as NodeB or a base transceiver station (BTS). The base station 100 may include a main body (also called a base station device) that controls wireless communication, and one or more remote radio heads (RRHs) disposed at a location different from a location of the main body. Further, various types of terminals, which will be described later, may operate as the base stations 100 by temporarily or semi-permanently executing a base station function.

Further, for example, the terminal device 200 may be realized as a smartphone, a tablet personal computer (PC), a notebook PC, a portable game terminal, a mobile terminal such as a portable/dongle type mobile router or a digital camera, or an in-vehicle terminal such as a car navigation device. Further, the terminal device 200 may be realized as a terminal (also called a machine type communication (MTC) terminal) that performs machine To machine (M2M) communication. Further, the terminal device 200 may be a wireless communication module (for example, an integrated circuit module composed of one die) mounted on the terminal.

5.1. Application Example Related to Base Station

First Application Example

Figure 20:
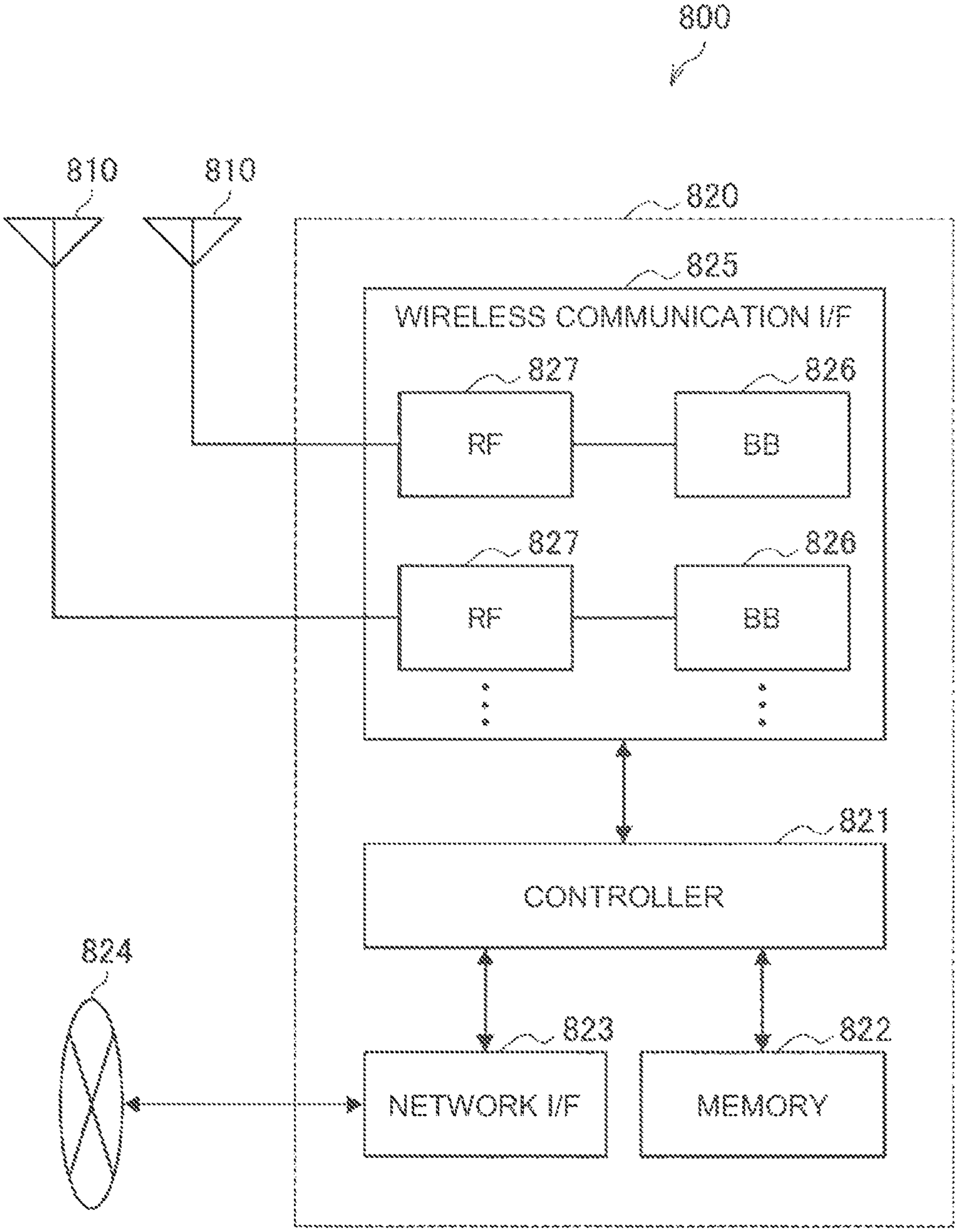
FIG. 20 is a block diagram illustrating a first example of a schematic configuration of an eNB.

FIG. 20 is a block diagram illustrating a first example of a schematic configuration of an eNB to which the technology according to the present disclosure can be applied. An eNB 800 has one or more antennas 810 and a base station device 820. Each antenna 810 and the base station device 820 can be connected to each other via an RF cable.

Each of the antennas 810 has one or more antenna elements (for example, a plurality of antenna elements forming a MIMO antenna) and is used for transmission and reception of radio signals by the base station device 820. The eNB 800 has a plurality of antennas 810 as illustrated in FIG. 20, and the plurality of antennas 810 may correspond to a plurality of frequency bands used by the eNB 800, for example. Although FIG. 20 illustrates an example in which the eNB 800 has the plurality of antennas 810, the eNB 800 may have a single antenna 810.

The base station device 820 includes a controller 821, a memory 822, a network interface 823, and a wireless communication interface 825.

The controller 821 may be, for example, a CPU or DSP and operates various functions of upper layers of the base station device 820. For example, the controller 821 generates a data packet from data in a signal processed by the wireless communication interface 825 and transfers the generated packet via the network interface 823. The controller 821 may generate a bundled packet by bundling data from a plurality of baseband processors and transfer the generated bundled packet. Further, the controller 821 may have a logical function that executes control such as radio resource control, radio bearer control, mobility management, admission control, or scheduling. Further, the control may be executed in cooperation with a peripheral eNB or core network node. The memory 822 includes a RAM and a ROM, and stores a program executed by the controller 821 and various control data (for example, a terminal list, transmitted power data, scheduling data, and the like).

The network interface 823 is a communication interface for connecting the base station device 820 to a core network 824. The controller 821 may communicate with the core network node or other eNB via the network interface 823. In that case, the eNB 800 and the core network node or other eNB may be connected to each other by a logical interface (for example, an S1 interface or an X2 interface). The network interface 823 may be a wired communication interface or a wireless communication interface for a wireless backhaul. When the network interface 823 is a wireless communication interface, the network interface 823 may use a higher frequency band than a frequency band used by the wireless communication interface 825 for wireless communication.

The wireless communication interface 825 supports a cellular communication system such as Long Term Evolution (LTE) or LTE-Advanced, and provides wireless connection to a terminal located in the cell of the eNB 800 via the antenna 810. The wireless communication interface 825 can typically include baseband (BB) processors 826 and RF circuits 827. The BB processor 826 may perform, for example, encoding/decoding, modulation/demodulation, and multiplexing/demultiplexing, and executes various signal processing of each layer (for example, L1, Medium Access Control (MAC), Radio Link Control (RLC), and Packet Data Convergence Protocol (PDCP)). The BB processor 826 may have some or all of the above-mentioned logical functions instead of the controller 821. The BB processor 826 may be a module including a memory for storing a communication control program, a processor for executing the program, and related circuits, and the functions of the BB processor 826 may be changed by updating the above program. Further, the module may be a card or a blade inserted into a slot of the base station device 820, or may be a chip mounted on the card or the blade. On the other hand, the RF circuit 827 may include a mixer, a filter, and an amplifier, and transmits and receives radio signals via the antenna 810.

The wireless communication interface 825 includes a plurality of BB processors 826 as illustrated in FIG. 20, and the plurality of BB processors 826 may correspond to a plurality of frequency bands used by the eNB 800, for example. Further, the wireless communication interface 825 includes a plurality of RF circuits 827 as illustrated in FIG. 20, and the plurality of RF circuits 827 may correspond to, for example, a plurality of antenna elements. Although FIG. 20 illustrates an example in which the wireless communication interface 825 includes the plurality of BB processors 826 and the plurality of RF circuits 827, the wireless communication interface 825 may include a single BB processor 826 or a single RF circuit 827.

In the eNB 800 illustrated in FIG. 20, one or more components (the setting unit 151 and/or the communication control unit 153) included in the control unit 150 described with reference to FIG. 8 may be mounted in the wireless communication interface 825. Alternatively, at least some of these components may be mounted in the controller 821. As an example, the eNB 800 may be equipped with a module including a part (for example, the BB processor 826) or all of the wireless communication interface 825 and/or the controller 821, and one or more of the above components may be mounted in the module. In this case, the module may store a program for causing the processor to function as one or more of the above components (in other words, a program for causing the processor to perform the operations of one or more of the above components), and may execute the program. As another example, the program for causing the processor to function as one or more of the above components may be installed in the eNB 800, and the wireless communication interface 825 (for example, the BB processor 826) and/or the controller 821 may execute the program. As described above, the eNB 800, the base station device 820, or the module may be provided as a device including one or more of the above components, and the program for causing the processor to function as one or more of the above components may be provided. Further, a readable recording medium on which the above program has been recorded may be provided.

Further, in the eNB 800 illustrated in FIG. 20, the wireless communication unit 120 described with reference to FIG. 8 may be mounted in the wireless communication interface 825 (for example, the RF circuit 827). Further, the antenna unit 110 may be mounted in the antenna 810. Further, the network communication unit 130 may be mounted in the controller 821 and/or the network interface 823. Further, the storage unit 140 may be mounted in the memory 822.

Second Application Example

Figure 21:
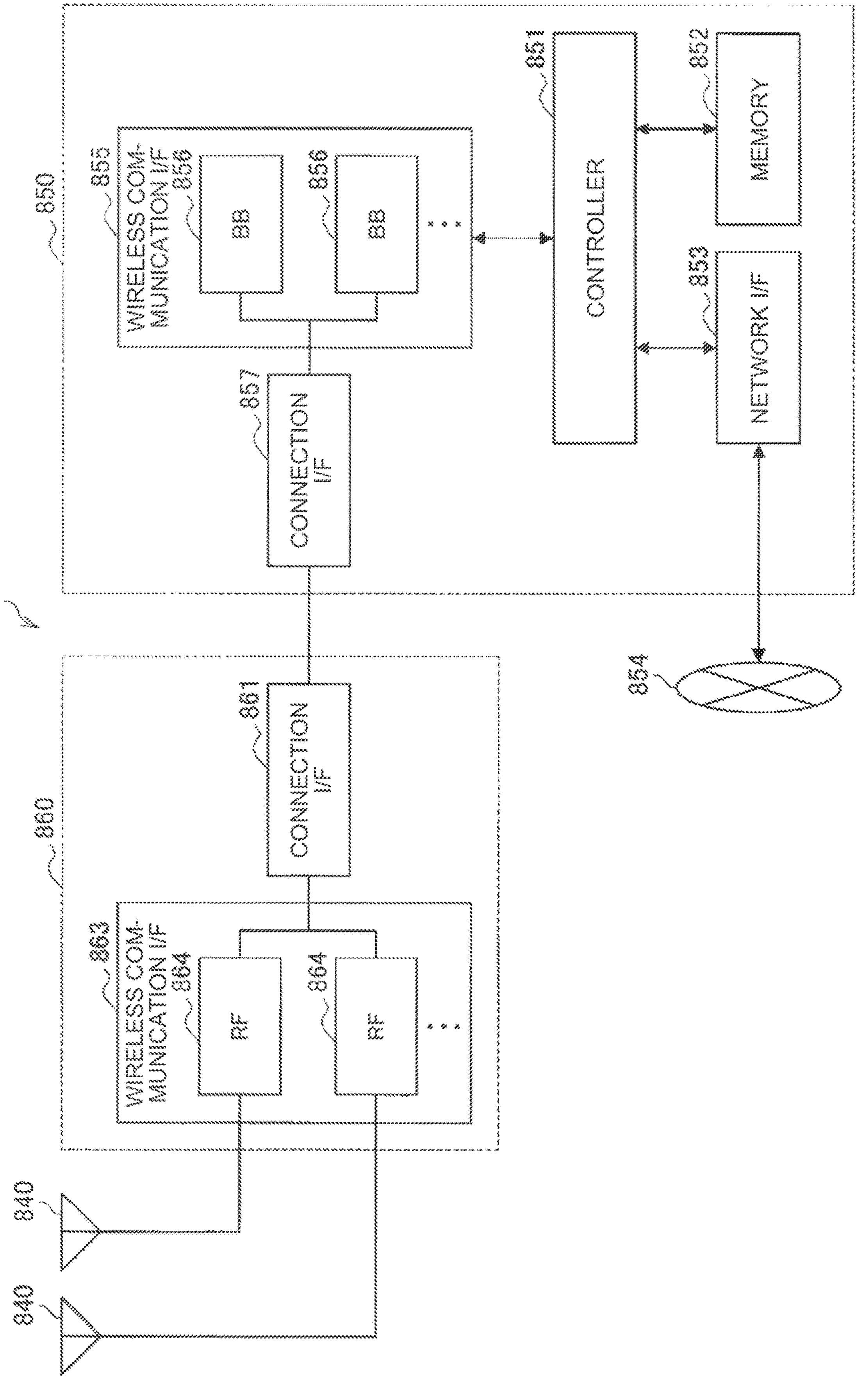
FIG. 21 is a block diagram illustrating a second example of a schematic configuration of an eNB.

FIG. 21 is a block diagram illustrating a second example of a schematic configuration of an eNB to which the technology according to the present disclosure can be applied. An eNB 830 has one or more antennas 840, a base station device 850, and an RRH 860. Each antenna 840 and the RRH 860 may be connected to each other via an RF cable. Further, the base station device 850 and the RRH 860 can be connected to each other by a high-speed line such as an optical fiber cable.

Each of the antennas 840 has one or more antenna elements (for example, a plurality of antenna elements forming a MIMO antenna) and is used for transmission and reception of radio signals by the RRH 860. The eNB 830 has a plurality of antennas 840 as illustrated in FIG. 21, and the plurality of antennas 840 may correspond to a plurality of frequency bands used by the eNB 830, for example. Although FIG. 21 illustrates an example in which the eNB 830 has the plurality of antennas 840, the eNB 830 may have a single antenna 840.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 19.

The wireless communication interface 855 supports a cellular communication system such as LTE or LTE-Advanced, and provides wireless connection to terminals located in a sector corresponding to the RRH 860 via the RRH 860 and the antenna 840. The wireless communication interface 855 can typically include BB processors 856 and the like. The BB processor 856 is the same as the BB processor 826 described with reference to FIG. 20, except that it is connected to an RF circuit 864 of the RRH 860 via the connection interface 857. The wireless communication interface 855 includes a plurality of BB processors 856 as illustrated in FIG. 21, and the plurality of BB processors 856 may correspond to a plurality of frequency bands used by the eNB 830, for example. Although FIG. 21 illustrates an example in which the wireless communication interface 855 includes the plurality of BB processors 856, the wireless communication interface 855 may include a single BB processor 856.

The connection interface 857 is an interface for connecting the base station device 850 (wireless communication interface 855) to the RRH 860. The connection interface 857 may be a communication module for communication on the high-speed line that connects the base station device 850 (wireless communication interface 855) and the RRH 860.

The RRH 860 further includes a connection interface 861 and a wireless communication interface 863.

The connection interface 861 is an interface for connecting the RRH 860 (wireless communication interface 863) to the base station device 850. The connection interface 861 may be a communication module for communication on the high-speed line.

The wireless communication interface 863 transmits and receives radio signals via the antenna 840. The wireless communication interface 863 can typically include RF circuits 864 and the like. The RF circuit 864 may include a mixer, a filter, and an amplifier, and transmits and receives radio signals via the antenna 840. As illustrated in FIG. 21, the wireless communication interface 863 includes a plurality of RF circuits 864, and the plurality of RF circuits 864 may correspond to, for example, a plurality of antenna elements. Although FIG. 21 illustrates an example in which the wireless communication interface 863 includes the plurality of RF circuits 864, the wireless communication interface 863 may include a single RF circuit 864.

In the eNB 830 illustrated in FIG. 21, one or more components (the setting unit 151 and/or the communication control unit 153) included in the control unit 150 described with reference to FIG. 8 may be mounted in the wireless communication interface 855 and/or the wireless communication interface 863. Alternatively, at least some of these components may be mounted in the controller 851. As an example, the eNB 830 may be equipped with a module including a part (for example, the BB processor 856) or all of the wireless communication interface 855 and/or the controller 851, and one or more of the above components may be mounted in the module. In this case, the module may store a program for causing the processor to function as one or more of the above components (in other words, a program for causing the processor to perform the operations of one or more of the above components), and may execute the program. As another example, the program for causing the processor to function as one or more of the above components may be installed in the eNB 830 and the wireless communication interface 855 (for example, the BB processor 856) and/or the controller 851 may execute the program. As described above, the eNB 830, the base station device 850, or the module may be provided as a device including one or more of the above components, and the program for causing the processor to function as one or more of the above components may be provided. Further, a readable recording medium on which the above program has been recorded may be provided.

Further, in the eNB 830 illustrated in FIG. 21, for example, the wireless communication unit 120 described with reference to FIG. 8 may be mounted in the wireless communication interface 863 (for example, the RF circuit 864). Further, the antenna unit 110 may be mounted in the antenna 840. Further, the network communication unit 130 may be mounted in the controller 851 and/or the network interface 853. Further, the storage unit 140 may be mounted in the memory 852.

5.2. Application Example Related to Terminal Device

First Application Example

Figure 22:
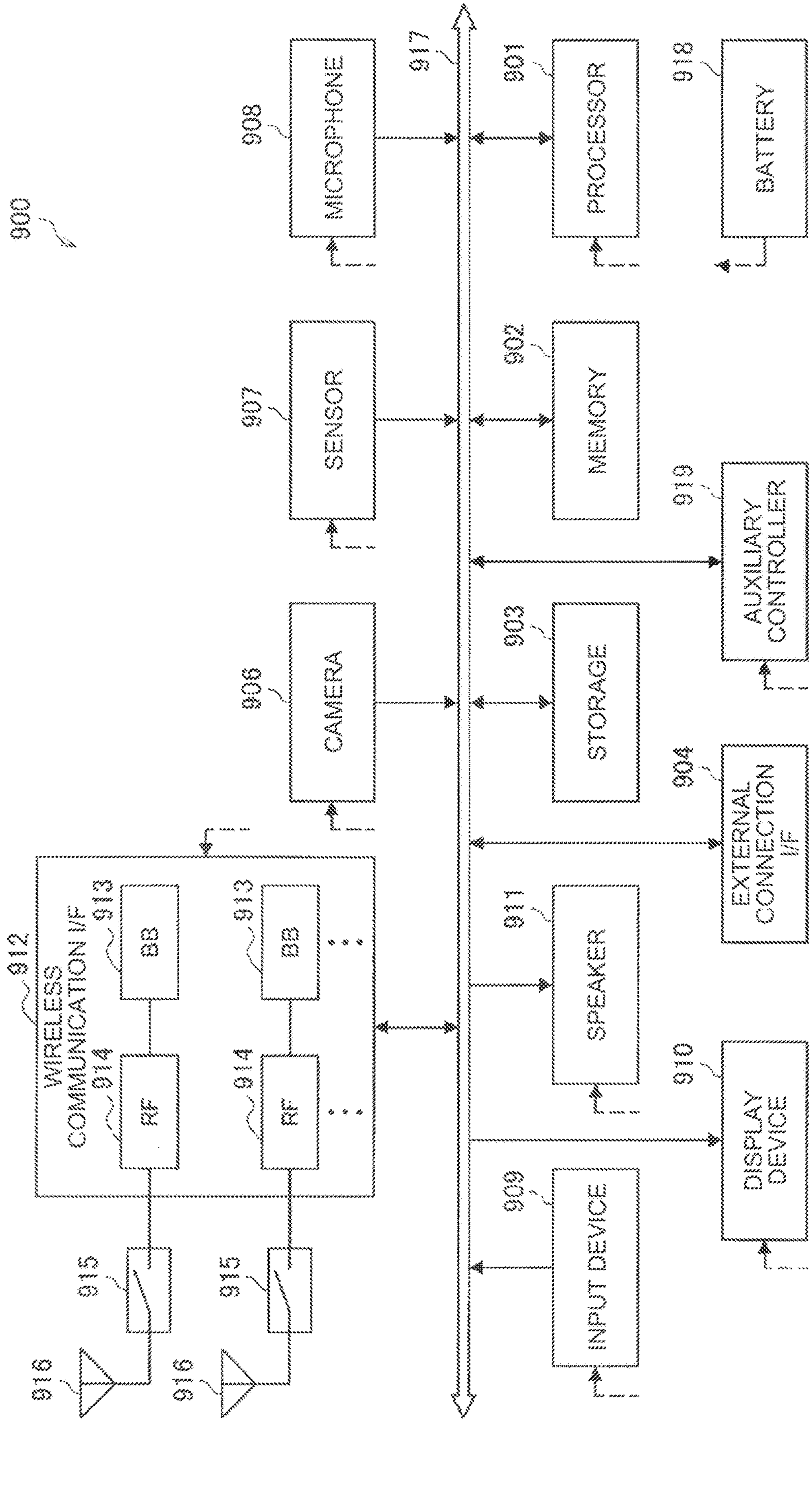
FIG. 22 is a block diagram illustrating an example of a schematic configuration of a smartphone.

FIG. 22 is a block diagram illustrating an example of a schematic configuration of a smartphone 900 to which the technology according to the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a System on Chip (SoC), and controls functions of an application layer and other layers of the smartphone 900. The memory 902 includes a RAM and a ROM and stores programs and data executed by the processor 901. The storage 903 may include a storage medium such as a semiconductor memory or a hard disk. The external connection interface 904 is an interface for connecting an external device such as a memory card or a universal serial bus (USB) device to the smartphone 900.

The camera 906 has an imaging element such as a charge coupled device (CCD) or a complementary metal oxide semiconductor (CMOS), and generates an imaging image. The sensor 907 can include, for example, a group of sensors such as a positioning sensor, a gyro sensor, a geomagnetic sensor, and an acceleration sensor. The microphone 908 converts a voice input to the smartphone 900 into a voice signal. The input device 909 includes, for example, a touch sensor, a keypad, a keyboard, a button, or a switch that detects a touch on a screen of the display device 910, and receives an operation or information input from a user. The display device 910 has a screen such as a liquid crystal display (LCD) or an organic light emitting diode (OLED) display, and displays an output image of the smartphone 900. The speaker 911 converts the voice signal output from the smartphone 900 into a voice.

The wireless communication interface 912 supports a cellular communication system such as LTE or LTE-Advanced and performs wireless communication. The wireless communication interface 912 can typically include a BB processor 913 and an RF circuit 914. The BB processor 913 may perform, for example, encoding/decoding, modulation/demodulation, and multiplexing/demultiplexing, and performs various signal processing for wireless communication. On the other hand, the RF circuit 914 may include a mixer, a filter, and an amplifier, and transmits and receives radio signals via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 22. Although FIG. 22 illustrates an example in which the wireless communication interface 912 includes the plurality of BB processors 913 and the plurality of RF circuits 914, the wireless communication interface 912 may include a single BB processor 913 or a single RF circuit 914.

Further, the wireless communication interface 912 may support other types of wireless communication systems such as a short-range wireless communication system, a near-field wireless communication system, or a wireless local area network (LAN) system, in addition to the cellular communication system. In that case, the BB processor 913 and the RF circuit 914 for each wireless communication system may be included.

Each of the antenna switches 915 switches the connection destination of the antenna 916 between a plurality of circuits included in the wireless communication interface 912 (for example, circuits for different wireless communication systems).

Each of the antennas 916 has one or more antenna elements (for example, a plurality of antenna elements forming a MIMO antenna) and is used for transmission and reception of radio signals by the wireless communication interface 912. The smartphone 900 may have a plurality of antennas 916 as illustrated in FIG. 22. Although FIG. 22 illustrates an example in which the smartphone 900 has the plurality of antennas 916, the smartphone 900 may have a single antenna 916.

Further, the smartphone 900 may include the antenna 916 for each wireless communication system. In that case, the antenna switch 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to each block of the smartphone 900 illustrated in FIG. 22 via a feed line partially illustrated by a broken line in the drawing. The auxiliary controller 919 operates minimum necessary functions of the smartphone 900, for example, in a sleep mode.

In the smartphone 900 illustrated in FIG. 22, one or more components (the acquisition unit 241 and/or the communication control unit 243) included in the control unit 240 described with reference to FIG. 9 may be mounted in the wireless communication interface 912. Alternatively, at least some of these components may be mounted in the processor 901 or the auxiliary controller 919. As an example, the smartphone 900 may be equipped with a module including a part (for example, the BB processor 913) or all of the wireless communication interface 912, the processor 901, and/or the auxiliary controller 919, and one or more of the above components may be mounted in the module. In this case, the module may store a program for causing the processor to function as one or more of the above components (in other words, a program for causing the processor to perform the operations of one or more of the above components), and may execute the program. As another example, the program for causing the processor to function as one or more of the above components may be installed in the smartphone 900 and the wireless communication interface 912 (for example, the BB processor 913), the processor 901, and/or the auxiliary controller 919 may execute the program. As described above, the smartphone 900 or the module may be provided as a device including one or more of the above components, and the program for causing the processor to function as one or more of the above components may be provided. Further, a readable recording medium on which the above program has been recorded may be provided.

Further, in the smartphone 900 illustrated in FIG. 22, for example, the wireless communication unit 220 described with reference to FIG. 9 may be mounted in the wireless communication interface 912 (for example, the RF circuit 914). Further, the antenna unit 210 may be mounted in the antenna 916. Further, the storage unit 230 may be mounted in the memory 902.

Second Application Example

Figure 23:
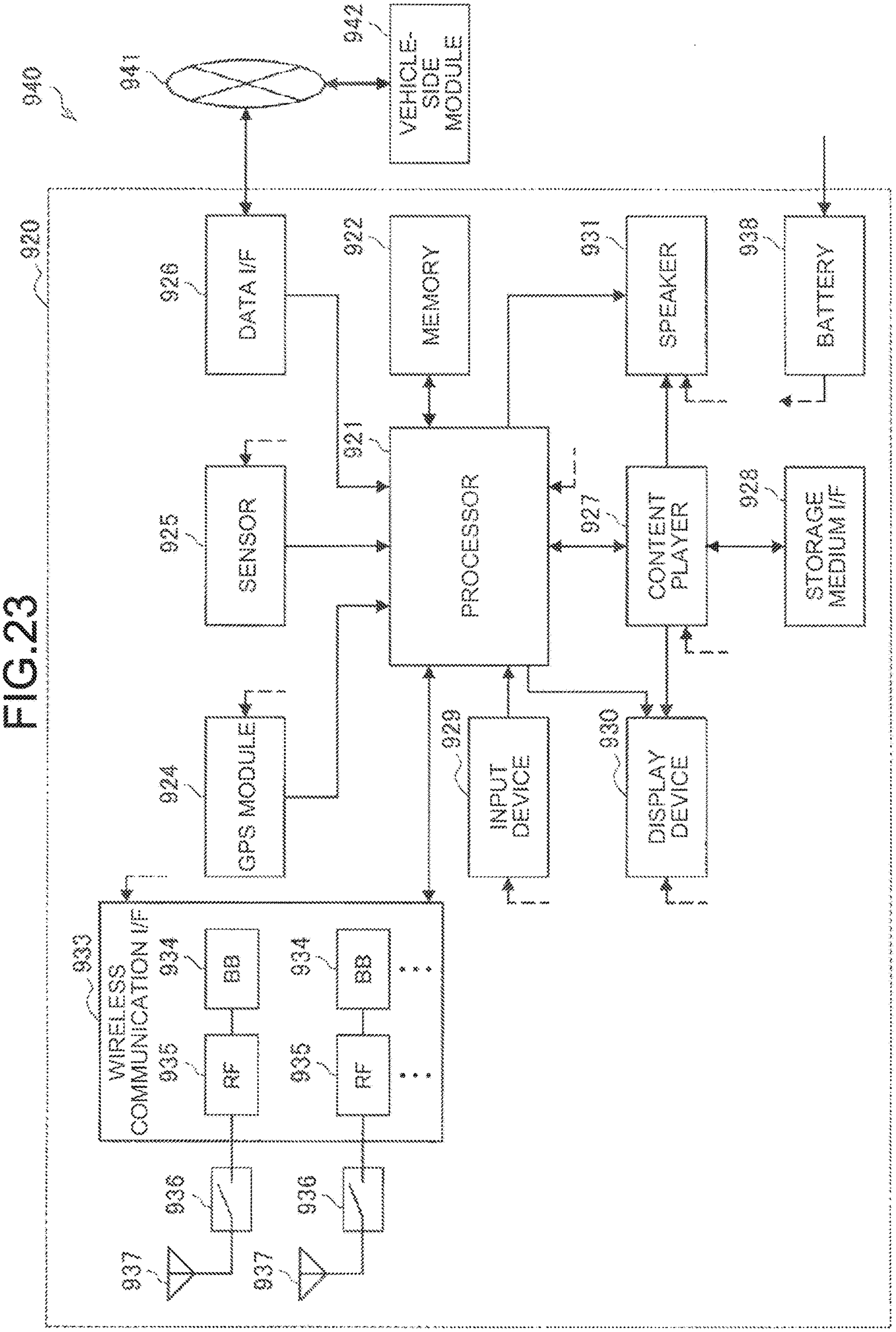
FIG. 23 is a block diagram illustrating an example of a schematic configuration of a car navigation device.

FIG. 23 is a block diagram illustrating an example of a schematic configuration of a car navigation device 920 to which the technology according to the present disclosure can be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or SoC, and controls a navigation function and other functions of the car navigation device 920. The memory 922 includes a RAM and a ROM and stores programs and data executed by the processor 921.

The GPS module 924 uses GPS signals received from GPS satellites to measure a position (for example, the latitude, the longitude, and the altitude) of the car navigation device 920. The sensor 925 may include, for example, a group of sensors such as a gyro sensor, a geomagnetic sensor, and a barometric pressure sensor. The data interface 926 is connected to an in-vehicle network 941 via a terminal (not illustrated), and acquires data generated on the vehicle side such as vehicle speed data.

The content player 927 plays contents stored in a storage medium (for example, a CD or a DVD) inserted into the storage medium interface 928. The input device 929 includes, for example, a touch sensor, a button, or a switch that detects a touch on the screen of the display device 930, and receives an operation or information input from the user. The display device 930 has a screen such as an LCD or OLED display and displays an image of a navigation function or contents to be played. The speaker 931 outputs a voice of the navigation function or the contents to be played.

The wireless communication interface 933 supports a cellular communication system such as LTE or LTE-Advanced and performs wireless communication. The wireless communication interface 933 can typically include BB processors 934 and RF circuits 935. The BB processor 934 may perform, for example, encoding/decoding, modulation/demodulation, and multiplexing/demultiplexing, and performs various signal processing for wireless communication. On the other hand, the RF circuit 935 may include a mixer, a filter, and an amplifier, and transmits and receives radio signals via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 23. Although FIG. 23 illustrates an example in which the wireless communication interface 933 includes the plurality of BB processors 934 and the plurality of RF circuits 935, the wireless communication interface 933 may include a single BB processor 934 or a single RF circuit 935.

Further, the wireless communication interface 933 may support other types of wireless communication systems such as a short-range wireless communication system, a near-field wireless communication system, or a wireless LAN system, in addition to the cellular communication system. In that case, the BB processor 934 and the RF circuit 935 for each wireless communication system may be included.

Each of the antenna switches 936 switches the connection destination of the antenna 937 between a plurality of circuits included in the wireless communication interface 933 (for example, circuits for different wireless communication systems).

Each of the antennas 937 has one or more antenna elements (for example, a plurality of antenna elements forming a MIMO antenna) and is used for transmission and reception of radio signals by the wireless communication interface 933. The car navigation device 920 may have a plurality of antennas 937 as illustrated in FIG. 23. Although FIG. 23 illustrates an example in which the car navigation device 920 has the plurality of antennas 937, the car navigation device 920 may have a single antenna 937.

Further, the car navigation device 920 may include the antenna 937 for each wireless communication system. In that case, the antenna switch 936 may be omitted from the configuration of the car navigation device 920.

The battery 938 supplies power to each block of the car navigation device 920 illustrated in FIG. 23 via a feed line partially illustrated by a broken line in the drawing. Further, the battery 938 stores power supplied from the vehicle side.

In the car navigation device 920 illustrated in FIG. 23, one or more components (the acquisition unit 241 and/or the communication control unit 243) included in the control unit 240 described with reference to FIG. 9 may be mounted in the wireless communication interface 933. Alternatively, at least some of these components may be mounted in the processor 921. As an example, the car navigation device 920 may be equipped with a module including a part (for example, the BB processor 934) or all of the wireless communication interface 933 and/or the processor 921, and one or more of the above components may be mounted in the module. In this case, the module may store a program for causing the processor to function as one or more of the above components (in other words, a program for causing the processor to perform the operations of one or more of the above components), and may execute the program. As another example, the program for causing the processor to function as one or more of the above components may be installed in the car navigation device 920, and the wireless communication interface 933 (for example, the BB processor 934) and/or the processor 921 may execute the program. As described above, the car navigation device 920 or the module may be provided as a device including one or more of the above components, and the program for causing the processor to function as one or more of the above components may be provided. Further, a readable recording medium on which the above program has been recorded may be provided.

Further, in the car navigation device 920 illustrated in FIG. 23, for example, the wireless communication unit 220 described with reference to FIG. 11 may be mounted in the wireless communication interface 933 (for example, the RF circuit 935). Further, the antenna unit 210 may be mounted in the antenna 937. Further, the storage unit 230 may be mounted in the memory 922.

Further, the technology according to the present disclosure may be realized as the in-vehicle system (or the vehicle) 940 including one or more blocks of the car navigation device 920 described above, the in-vehicle network 941, and the vehicle-side module 942. The vehicle-side module 942 generates vehicle-side data such as a vehicle speed, an engine speed, or failure information, and outputs the generated data to the in-vehicle network 941.

6. CONCLUSION

As described above, according to each embodiment of the present disclosure, the terminal device 200 that can perform reporting by using a plurality of beams arriving from the different base stations 100 having the same cell ID and selecting a desired beam from the beams transmitted by the respective base stations 100 is provided. According to the present embodiment, since the terminal device 200 can select the optimum beam of the plurality of base stations 100 from a series of beams, an operation rate of the terminal device 200 can be lowered, and power consumption of the terminal device 200 can be reduced.

Each step in the processing performed by each device of the present specification does not necessarily have to be processed in chronological order according to the order described as a sequence diagram or a flowchart. For example, each step in the processing executed by each device may be processed in order different from the order described as the flowchart, or may be processed in parallel.

Further, it is possible to create a computer program for causing the hardware such as the CPU, the ROM, and the RAM incorporated in each device to exhibit the same functions as the configuration of each device described above. Further, a storage medium in which the computer program is stored can be provided. Further, by configuring each functional block illustrated in the functional block diagram with hardware, a series of processing can be realized by the hardware.

The preferred embodiments of the present disclosure have been described in detail with reference to the accompanying drawings, but the technical scope of the present disclosure is not limited to such examples. It is obvious that a person with an ordinary skill in a technological field of the present disclosure could conceive of various alterations or corrections within the scope of the technical ideas described in the appended claims, and it should be understood that such alterations or corrections will naturally belong to the technical scope of the present disclosure.

Furthermore, the effects described in the present specification are merely illustrative or exemplary and are not restrictive. That is, the technology according to the present disclosure can exhibit other effects obvious to those skilled in the art from the description of the present specification in addition to or in place of the above effects.

Note that the following configurations also belong to the technical scope of the present disclosure.

(1)

A communication device comprising:

an acquisition unit that acquires setting for transmitting measurement results of beams by setting synchronization signal blocks transmitted from base stations having the same cell identifier as one synchronization signal group and specifying a synchronization signal block in the synchronization signal group and the base station to which the synchronization signal block belongs; and a communication control unit that transmits the measurement results of the beams on the basis of the setting.

(2)

The communication device according to (1), wherein the communication control unit determines the maximum number of base stations to which the measurement results of the beams are transmitted among the base stations having the same cell identifier, on the basis of a limitation on the number of base stations to which the measurement results of the beams are transmitted.

(3)

The communication device according to (1) or (2), wherein, when the synchronization signal blocks included in the synchronization signal group are linked to a plurality of base stations, the communication control unit uses an uplink resource for random access set for each base station.

(4)

The communication device according to (3), wherein the uplink resource for random access is a resource common to all the base stations.

(5)

The communication device according to (3) or (4), wherein the communication control unit sets discrimination information to a message part following a preamble part of a message transmitted by a common uplink resource for the random access.

(6)

The communication device according to (5), wherein the discrimination information is information for allowing each base station to discriminate a base station among the plurality of base stations which is randomly accessed.

(7)

The communication device according to (3) or (4), wherein the communication control unit sets discrimination information to a preamble part of a message transmitted by a common uplink resource for the random access.

(8)

The communication device according to (7), wherein the discrimination information is information for allowing each base station to discriminate a base station among the plurality of base stations which is randomly accessed.

(9)

The communication device according to any one of (3) to (8), wherein the communication control unit independently sets a link between an uplink resource for random access for the base stations prepared for the number of base stations having the same cell identifier and each base station.

(10)

The communication device according to (9), wherein, when the random access using the uplink resource fails, an area for executing second random access is set in the uplink resource.

(11)

A communication control device comprising:

a communication control unit that generates setting for causing a terminal device to transmit measurement results of beams by setting synchronization signal blocks transmitted from base stations having the same cell identifier as one synchronization signal group and specifying a synchronization signal block in the synchronization signal group and the base station to which the synchronization signal block belongs; and an acquisition unit that acquires the measurement results of the beams based on the setting from the terminal device.

(12)

The communication control device according to (11), wherein the communication control unit performs setting for limiting the number of base stations for causing the terminal device to transmit the measurement results of the beams.

(13)

The communication control device according to (11) or (12), wherein, when the synchronization signal blocks included in the synchronization signal group are linked to a plurality of base stations, the communication control unit sets an uplink resource for random access set for each base station.

(14)

The communication control device according to (13), wherein the uplink resource for the random access is a resource common to all the base stations.

(15)

A communication method comprising:

acquiring setting for transmitting measurement results of beams by setting synchronization signal blocks transmitted from base stations having the same cell identifier as one synchronization signal group and specifying a synchronization signal block in the synchronization signal group and the base station to which the synchronization signal block belongs; and transmitting the measurement results of the beams on the basis of the setting.

(16)

A communication control method comprising:

generating setting for causing a terminal device to transmit measurement results of beams by setting synchronization signal blocks transmitted from base stations having the same cell identifier as one synchronization signal group and specifying a synchronization signal block in the synchronization signal group and the base station to which the synchronization signal block belongs; and acquiring the measurement results of the beams based on the setting from the terminal device.

(17)

A computer program for causing a computer to execute:

acquiring setting for transmitting measurement results of beams by setting synchronization signal blocks transmitted from base stations having the same cell identifier as one synchronization signal group and specifying a synchronization signal block in the synchronization signal group and the base station to which the synchronization signal block belongs; and transmitting the measurement results of the beams on the basis of the setting.

(18)

A computer program for causing a computer to execute:

generating setting for causing a terminal device to transmit measurement results of beams by setting synchronization signal blocks transmitted from base stations having the same cell identifier as one synchronization signal group and specifying a synchronization signal block in the synchronization signal group and the base station to which the synchronization signal block belongs; and acquiring the measurement results of the beams based on the setting from the terminal device.

REFERENCE SIGNS LIST

100 BASE STATION

200 TERMINAL DEVICE

What is claimed is:

1. A first communication device, comprising:

circuitry configured to:

acquire configuration information for transmission of measurement results;

receive first measurement signals associated with a set of beams of a plurality of beam groups, wherein the plurality of beam groups corresponds to groups of synchronization signal blocks;

select, from the set of beams, a plurality of beams based on received power of each of the set of beams;

configure the measurement results of the set of beams based on the first measurement signals and the configuration information, wherein the measurement results include information indicating the selected plurality of beams; and transmit the measurement results of the selected plurality of beams, wherein the configuration information includes:

correlation information between each of the set of beams and a corresponding base station of a plurality of base stations, and an indication for the first communication device to configure the measurement results for the selection of the plurality of beams for a respective one of the groups of synchronization signal blocks.

2. The first communication device according to claim 1, wherein the configuration information further includes information associated with a number of the selected plurality of beams.

3. The first communication device according to claim 2, wherein the information associated with the number of the selected plurality of beams includes a maximum number of the selected plurality of beams for which the measurement results are reported to the corresponding base station of the plurality of base stations.

4. The first communication device according to claim 1, wherein at least one of the groups of synchronization signal blocks is associated with an uplink resource group including a plurality of uplink resources.

5. The first communication device according to claim 4, wherein the circuitry is further configured to:

allocate a first uplink resource, from the plurality of uplink resources, for a first random access procedure; and perform a two-step random access procedure as the first random access procedure for connection of the first communication device to at least one of a first base station of the plurality of base stations or a second base station of the plurality of base stations.

6. The first communication device according to claim 5, wherein the circuitry is further configured to allocate a second uplink resource, from the uplink resource group, for a second random access procedure based on failure of the first random access procedure.

7. The first communication device according to claim 6, wherein the uplink resource group is configured to be shared with a third random access procedure executed between a second communication device and at least one of the plurality of base stations.

8. The first communication device according to claim 7, wherein the first base station and the second base station have a same cell identifier.

9. The first communication device according to claim 1, wherein the correlation information indicates:

a first correlation between a first beam of the set of beams and a first base station of the plurality of base stations; and a second correlation between a second beam of the set of beams and a second base station of the plurality of base stations.

10. A first base station, comprising:

control circuitry; and a plurality of antennas, wherein the control circuitry is configured to:

transmit, via the plurality of antennas, configuration information for configuring measurement results;

transmit, via the plurality of antennas to a first communication device, first measurement signals associated with a set of beams of one of a plurality of beam groups, wherein the plurality of beam groups corresponds to groups of synchronization signal blocks; and receive, from the first communication device via the plurality of antennas, the measurement results of the set of beams based on the first measurement signals, wherein the measurement results include information indicating the set of beams, and the configuration information includes:

correlation information between each of the set of beams and a corresponding base station of a plurality of base stations of a base station group, wherein the first base station is a member of the base station group, and an indication for the first communication device to configure the measurement results for selection of at least one beam of the set of beams for a respective one of the groups of synchronization signal blocks.

11. The first base station according to claim 10, wherein the configuration information further includes information associated with a number of the set of beams.

12. The first base station according to claim 11, wherein the information associated with the number of the set of beams includes a maximum number of the set of beams for which the measurement results are reported to the corresponding base station of the plurality of base stations.

13. The first base station according to claim 10, wherein at least one of the groups of synchronization signal blocks is associated with an uplink resource group including a plurality of uplink resources.

14. The first base station according to claim 13, wherein the control circuitry is further configured to:

respond to a two-step random access procedure, wherein the first communication device performs the two-step random access procedure as a first random access procedure using a first uplink resource of the uplink resource group.

15. The first base station according to claim 14, wherein the control circuitry is further configured to respond to a second random access procedure based on failure of the first random access procedure, and the first communication device performs the second random access procedure using a second uplink resource of the uplink resource group.

16. The first base station according to claim 15, wherein the uplink resource group is configured to be shared with a third random access procedure executed between a second communication device and a second base station.

17. The first base station according to claim 10, wherein the correlation information indicates:

a first correlation between a first beam of the set of beams and the first base station; and a second correlation between a second beam of the set of beams and a second base station of the base station group.

18. The first base station according to claim 17, wherein the first base station and the second base station have a same cell identifier.

19. The first base station according to claim 10, wherein each of the plurality of antennas includes an antenna panel, and the antenna panel is configured to direct a corresponding one of the set of beams.

20. The first base station according to claim 19, wherein the plurality of antennas includes a first antenna and a second antenna, and a direction of an orientation of a first antenna panel of the first antenna is different from a direction of an orientation of a second antenna panel of the second antenna.

* * * * *